United States Patent
Tsuji et al.

(10) Patent No.: US 10,826,056 B2
(45) Date of Patent: Nov. 3, 2020

(54) ELECTRODE SHEET USED IN NONAQUEOUS ELECTROLYTE SECONDARY BATTERY AND NONAQUEOUS ELECTROLYTE SECONDARY BATTERY

(71) Applicants: KANEKA CORPORATION, Osaka (JP); NAGOYA ELECTRICAL EDUCATIONAL FOUNDATION, Nagoya (JP)

(72) Inventors: Ryotaro Tsuji, Osaka (JP); Megumi Fujisaki, Osaka (JP); Yasushi Morita, Toyota (JP)

(73) Assignees: KANEKA CORPORATION, Osaka (JP); NAGOYA ELECTRICAL EDUCATIONAL FOUNDATION, Nagoya (JP)

( * ) Notice: Subject to any disclaimer, the term of this patent is extended or adjusted under 35 U.S.C. 154(b) by 64 days.

(21) Appl. No.: 15/870,232

(22) Filed: Jan. 12, 2018

(65) Prior Publication Data
US 2018/0138499 A1    May 17, 2018

Related U.S. Application Data

(63) Continuation of application No. PCT/JP2016/069811, filed on Jul. 4, 2016.

(30) Foreign Application Priority Data

Jul. 13, 2015   (JP) .................................. 2015-139965

(51) Int. Cl.
*H01M 4/1393*   (2010.01)
*H01M 4/60*   (2006.01)
(Continued)

(52) U.S. Cl.
CPC .......... *H01M 4/1393* (2013.01); *H01M 4/133* (2013.01); *H01M 4/587* (2013.01);
(Continued)

(58) Field of Classification Search
CPC ............. H01M 10/02; H01M 10/0525; H01M 2004/021; H01M 4/133; H01M 4/1393;
(Continued)

(56) References Cited

U.S. PATENT DOCUMENTS

2009/0075171 A1   3/2009 Feng et al.
2009/0098453 A1   4/2009 Liu et al.
(Continued)

FOREIGN PATENT DOCUMENTS

EP   2 037 516 A1   3/2009
JP   7-235330 A     9/1995
(Continued)

OTHER PUBLICATIONS

Machine Translation JP2005209498 (Year: 2005).*
(Continued)

*Primary Examiner* — Victoria H Lynch
(74) *Attorney, Agent, or Firm* — Oblon, McClelland, Maier & Neustadt, L.L.P.

(57) ABSTRACT

An electrode sheet including a multi-walled carbon nanotube including plural graphene layers, each of which has a
(Continued)

trioxotriangulene derivative of formula (1) dispersed therein,

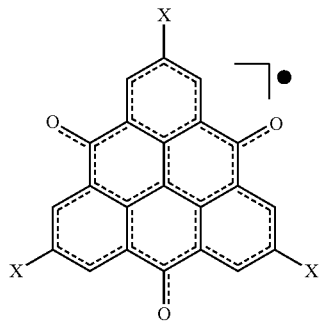
(1)

where X's are hydrogen, a halogen, or a monovalent organic group, and may be the same as or different from each other.

20 Claims, 25 Drawing Sheets

(51) Int. Cl.
| | | |
|---|---|---|
| H01M 10/0525 | (2010.01) | |
| H01M 4/133 | (2010.01) | |
| H01M 4/62 | (2006.01) | |
| H01M 4/587 | (2010.01) | |
| H01M 10/02 | (2006.01) | |
| H01M 4/36 | (2006.01) | |
| H01M 4/02 | (2006.01) | |

(52) U.S. Cl.
CPC .............. *H01M 4/60* (2013.01); *H01M 4/625* (2013.01); *H01M 10/02* (2013.01); *H01M 10/0525* (2013.01); *H01M 4/364* (2013.01); *H01M 2004/021* (2013.01); *Y02P 70/54* (2015.11); *Y02T 10/7011* (2013.01)

(58) Field of Classification Search
CPC ........ H01M 4/364; H01M 4/587; H01M 4/60; H01M 4/625
See application file for complete search history.

(56) References Cited

U.S. PATENT DOCUMENTS

| | | |
|---|---|---|
| 2009/0098463 A1 | 4/2009 | Liu et al. |
| 2011/0300448 A1 | 12/2011 | Feng et al. |
| 2014/0332731 A1* | 11/2014 | Ma .......................... H01B 1/04 |
| | | 252/506 |

FOREIGN PATENT DOCUMENTS

| | | |
|---|---|---|
| JP | 11-67207 A | 3/1999 |
| JP | 2005-209498 A | 8/2005 |
| JP | 2007-227186 A | 9/2007 |
| JP | 2009-295881 A | 12/2009 |
| JP | 2010-251442 A | 11/2010 |
| JP | 2014-107191 A | 6/2014 |
| WO | WO 2013/042706 A1 | 3/2013 |
| WO | WO 2014/077252 A1 | 5/2014 |

OTHER PUBLICATIONS

Machine Translation JPWO2013042706(A1) (Year: 2013).*
Machine Translation JP2009295881(A) (Year: 2009).*
Scientific and Technical Information Center (STIC) search results by R. Kahelin (Year: 2019).*
Yasushi Morita, et al., "Organic tailored batteries materials using stable open-shell molecules with degenerate frontier orbitals", Nature Materials, vol. 10, Dec. 2011, pp. 947-951.

* cited by examiner

ELECTRODE SHEET USED IN NONAQUEOUS ELECTROLYTE SECONDARY BATTERY AND NONAQUEOUS ELECTROLYTE SECONDARY BATTERY

CROSS-REFERENCE TO RELATED APPLICATIONS

The present application is a continuation of International Application No. PCT/JP2016/069811, filed Jul. 4, 2016, which is based upon and claims the benefits of priority to Japanese Application No. 2015-139965, filed Jul. 13, 2015. The entire contents of these applications are incorporated herein by reference.

TECHNICAL FIELD

The present invention relates to an electrode sheet to be used in a nonaqueous electrolyte secondary battery and a nonaqueous electrolyte secondary battery formed using such a sheet.

BACKGROUND ART

Because of a higher energy density and a greater capacity, nonaqueous electrolyte secondary batteries typically known as lithium-ion secondary batteries and the like are widely put into practical use such as power sources for mobile devices and batteries for electric vehicles.

As an electrode active material for a lithium-ion secondary battery these days, metal oxides such as a lithium cobalt oxide are mainly used. There have been problems, however, with lithium-ion secondary batteries formed by using a metal oxide such as a lithium cobalt oxide for their electrode active material; for example, when more than a certain amount of lithium ions are extracted from the electrode active material during charging, its crystal structure collapses and generates heat while forming oxygen, causing the battery to ignite. Moreover, since cobalt is a rare element, cost and availability have also been issues.

To solve the aforementioned problems of safety, cost and availability, technologies have been developed using organic compounds for the electrode active material. For example, Patent Literature 1 describes a lithium-ion secondary battery formed using a stable organic radical polymer as its electrode active material. As examples of stable organic radical polymers, polymers having nitroxyl radicals, polymers having oxyradicals and polymers having nitrogen radicals are listed in Patent Literature 1. However, such batteries face a problem of having lower charge/discharge capacity due to a smaller number of electrons being involved in charge/discharge reactions per 1 unit of electrode active material.

As an attempt to improve the charge/discharge capacity of a secondary battery, Patent Literature 2 proposes use of organic compounds capable of carrying oxidation/reduction reactions involving two or more electrons per 1 unit. As examples of such compounds, organic compounds having a phenalenyl skeleton are listed in Patent Literature 2 as a cathode active material. An electrode sheet is formed by using an organic compound having a phenalenyl skeleton, an auxiliary agent and a binder. However, a secondary battery formed using the electrode sheet has a maximum discharge capacity of 165 mAh/g. When the values were evaluated, the secondary battery formed using the electrode sheet exhibited properties only approximately equivalent to those of a conventional battery manufactured using a metal oxide.

In an attempt to produce a high-capacity lithium-ion secondary battery using an organic radical compound as the aforementioned organic compound, an example using a trioxotriangulene (TOT) derivative as an electrode active material is disclosed in Non-patent Literature 1.

A TOT derivative is a neutral radical compound having a condensed polycyclic molecular structure with a huge π-electron system where electron spins are widely delocalized throughout the molecular skeleton. Here, "localized spins" indicate a structure where electron spins are localized in part of the molecular skeleton, while "delocalized spins" indicate a structure where electron spins are widely distributed throughout the molecular skeleton. An example of TOT derivatives is a tert-butyl group substituted derivative obtained by substituting "X" in formula (1) below with a tert-butyl group.

[chem 1]

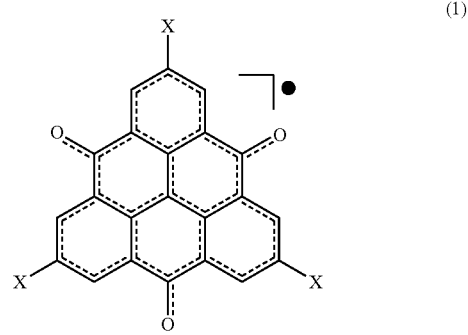

(1)

According to Non-Patent Literature 1, when a tert-butyl group substituted derivative was used as an electrode active material, the initial discharge capacity at 0.3 C resulted in a higher value such as 311 mAh/g. However, the value was lowered to 169 mAh/g in the second cycle, and cycle stability was unsatisfactory. Moreover, the maximum charge/discharge rate was 2 C, thus lacking high-speed charge/discharge characteristics.

Here, "C" used for measuring charge/discharge rates indicates a unit defined as the current value C/n, meaning a battery is charged/discharged in "n" hours. In other words, "1 C" indicates the current value at which it takes an hour for charging or discharging a battery. In actual charge/discharge testing, the value is set based on the theoretical capacity of the electrode active material.

CITATION LIST

Patent Literature

Patent Literature 1: JP2005-209498A
Patent Literature 2: JP2007-227186A
Patent Literature 3: JP2009-295881A

Non-Patent Literature

Non-patent Literature 1: Yasushi Morita, et al., "Organic tailored batteries materials using stable open-shell molecules with degenerate frontier orbitals," Nature Materials 10, 947-951 (2011)

SUMMARY OF THE INVENTION

Problems to be Solved by the Invention

The objective of the present invention is to provide an electrode sheet for a nonaqueous electrolyte secondary battery to achieve a higher charge/discharge capacity and excellent safety along with excellent high-speed charge/discharge characteristics and cycle characteristics, and to provide such a nonaqueous electrolyte secondary battery.

Solutions to the Problems

The inventors of the present invention have developed an electrode active material having a greater number of valence electrons per unit weight, and when the inventors further attempted to eliminate from the electrode the substances unnecessary for charge/discharge reactions, they have found the charge/discharge capacity per unit volume and per unit weight of a battery is maximized accordingly. Also, to perform high-speed charge/discharge cycles, they have found a novel material and structure that exhibit a higher electrical conductivity.

Namely, the present invention relates to an electrode sheet, containing a trioxotriangulene (TOT) derivative represented by formula (1) below and carbon nanotubes (CNTs), to be used in a nonaqueous electrolyte secondary battery.

[chem 1]

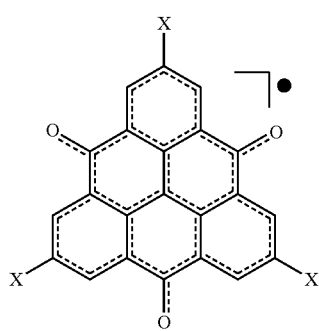

(1)

(In the formula, "X" is hydrogen, a halogen or a monovalent organic group, which may be the same as or different from each other.)

Furthermore, the inventors have developed a method for producing an electrode sheet to be used in a nonaqueous electrolyte secondary battery; an electrode sheet having two or more layers is formed by dispersing in a solvent a trioxotriangulene derivative represented by formula (1) above and carbon nanotubes, by filtering the dispersion at least twice, and by drying the residual filtrate.

Effects of the Invention

According to the present invention, a nonaqueous electrolyte secondary battery is provided to exhibit a higher charge/discharge capacity and excellent safety along with excellent high-speed charge/discharge characteristics and cycle characteristics.

The aforementioned and further additional advantages, characteristics and effects of the present invention are disclosed in the descriptions of embodiments provided below by referring to the drawings attached herein.

DETAILED DESCRIPTION OF THE EMBODIMENTS

Figure 1:
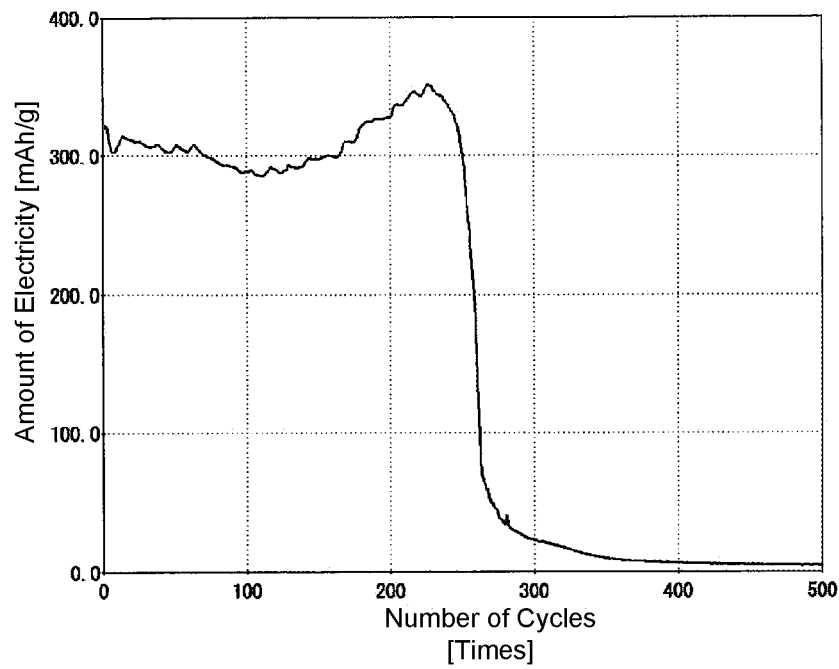
FIG. 1 is a graph showing changes in the discharge capacity of a lithium-ion secondary battery relative to the number of charge/discharge cycles according to Example 1 of the present invention.

In the following, the embodiments of the present invention are described. However, the present invention is not limited to the embodiments below. The scope of the present invention is shown by the scope of patent claims, and includes all the modifications and similar structures that fall within the scope of patent claims and the meaning and scope of any equivalent to the patent claims.

<Electrode Sheet>

The electrode sheet to be used in a nonaqueous electrolyte secondary battery according to an embodiment of the present invention is formed with a TOT derivative represented by formula (1) and CNTs (carbon nanotubes).

[chem 2]

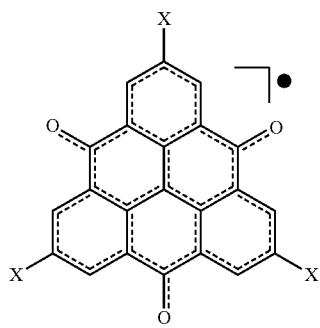

(1)

(In the formula, "X" is hydrogen, a halogen or a monovalent organic group, which may be the same as or different from each other.)

When "X" is a monovalent organic group in the TOT derivative represented by formula (1) above, examples of "X" are an alkyl group, aryl group, aralkyl group, carboxyl group, alkoxycarbonyl group, amino group, hydroxyl group, acyl group, nitro group and cyano group. Since a smaller molecular weight of "X" makes a higher charge/discharge capacity per unit volume and per unit weight of the battery, "X" is preferred to be hydrogen, a halogen, or an alkyl or aryl group having 6 or fewer carbon atoms. Among them, hydrogen is the most preferable since it has the smallest molecular weight.

In the embodiments of the present invention, CNTs are used as the conductive auxiliary for conductive network formation. A CNT has a structure of a graphene sheet rolled into a cylindrical shape.

The diameter of a cylindrical CNT used in the embodiments of the present invention is preferred to be 1 nm to 50 nm.

CNTs are sorted into single-walled CNTs having a single-layer cylindrical shape and multi-walled CNTs having a multi-layer cylindrical shape. Either type may be used for the embodiments of the present invention. Considering the cost, especially preferred are multi-walled CNTs.

From an efficiency viewpoint of forming conductive networks, the aspect ratio (length/diameter ratio) of a cylindrical shape is preferred to be 10 or greater, more preferably 100 or greater.

In the embodiments of the present invention, it is an option for the electrode sheet of a nonaqueous electrolyte secondary battery to contain or not to contain a binder. However, it is preferred for the sheet not to contain a binder to enhance the charge/discharge capacity per unit. Usually, in an electrode active material of a nonaqueous electrolyte secondary battery, a binder such as poly(vinylidene difluoride) (PVdF) or poly(tetrafluoroethylene) (PTFE) is contained to improve the formability of an electrode sheet. Since such a binder is a substance not involved in charge/discharge reactions, it is a factor that causes a decrease in charge/discharge capacity per unit volume and unit weight of the battery. In an electrode sheet related to the present invention, even when no binder is added or when the binder content is set smaller than the amount generally employed for a nonaqueous electrolyte secondary battery, the formability of an electrode sheet is not lowered and the electrode sheet exhibits a higher charge/discharge capacity per unit volume and unit weight of the battery.

In the embodiments of the present invention, the reason for an electrode sheet to be formable even if the binder content is small, or even if no binder is added, is that the formability of the electrode active material is enhanced because CNTs are entangled with each other.

The electrode sheet of a nonaqueous electrolyte secondary battery used in the embodiments of the present invention is formed by using an electrode active material that contains CNTs and a TOT derivative and by forming the material into a sheet shape.

An electrode sheet formed by mixing CNTs into a TOT derivative is expected to conduct a smooth electron transfer between CNTs and the TOT derivative through π-π interactions of CNTs and the TOT derivative, which is a condensed polycyclic benzenoid derivative. Moreover, entanglement of CNTs is expected to develop electrical conduction paths.

Furthermore, since π-π interactions are effective to capture the molecules of a TOT derivative, dissolution of the TOT derivative into an electrolyte is suppressed. When dissolution is suppressed, cycle characteristics of the battery will be enhanced.

To achieve efficient electrical conduction and electron transfer, it is important for a TOT to be sufficiently dispersed; namely, its dispersibility in CNT networks is important.

To increase the dispersibility of a TOT, it is effective to form a thin film of CNTs and a TOT derivative and to repeatedly laminate the thin films when CNTs and the TOT derivative are mixed to be formed into a sheet. When a thin-film laminate is formed, even if CNTs and the TOT are dissociated in one layer, the entire laminate retains a higher uniformity. Accordingly, the electrical conductivity of the electrode and the capacity of the battery are expected to improve.

Therefore, it is best to employ the method for producing an electrode sheet described below.

<Method for Producing Electrode Sheet>

A TOT derivative and CNTs in a solid state or in the presence of a small amount of solvent are mixed and stirred using a mortar, ball mill, homogenizer or mixer. Alternatively, they are dispersed in a solvent, and then mixed and stirred using a stirrer, ultrasonic wave irradiation device, shaker, FILMIX™ or the like.

From the viewpoint of efficiency for mixing, it is preferred to disperse a TOT derivative and CNTs in a solvent and then to stir and mix the dispersion. It is more preferred to irradiate ultrasonic waves during the mixing process.

The solvent is not limited to any particular type; examples are methanol, ethanol, isopropanol, toluene, N-methylpyrrolidone, dimethylformamide, dimethyl sulfoxide, dimethyl carbonate, diethyl carbonate, propylene carbonate and the like. Since the drying step after the formation of an electrode sheet is completed in a short period of time, a solvent with a boiling point of 100° C. or lower is preferred; among such solvents, methanol, ethanol or isopropanol is more preferable, considering the cost.

A dispersion of a TOT derivative and CNTs is prepared as above.

As for the method for producing an electrode sheet with CNTs laminated in layers, various methods are available; an example is to filtrate a dispersion of a TOT derivative and CNTs little by little through a filter so that residues are accumulated thereon. Such a filtration method is preferable because it is simple.

The type of filter used for filtration is not limited, but it is preferred to be a membrane filter to prevent CNTs from passing through the filter and draining into the filtrate. Especially, from a viewpoint of time efficiency, it is more preferred to filtrate the dispersion through a membrane filter under reduced pressure. The pore size of a membrane filter is preferred to be 0.05 µm to 3 µm. If the pore size is smaller than that range, filtration takes longer, and if the pore size is greater, some CNTs might drain into the filtrate.

A small amount of a dispersion of a TOT derivative and CNTs is supplied, and is then filtrated so that a thin residual layer remains on the filter. Next, a small amount of the dispersion is supplied again on top of the residue on the filter. When such a process is repeated two or more times, a laminate of two or more layers is obtained to have a thickness of (thickness of one layer obtained by one filtration)×(number of filtrations). It is thought that the thinner the one layer, the better the dispersibility of the TOT derivative. However, forming a thinner layer means an increase in the number of filtrations, thus causing a longer processing time. Therefore, the thickness of one layer is preferred to be 0.1 µm~10 µm, more preferably 0.1 µm~2 µm, in terms of balancing dispersibility and time efficiency.

For example, if the thickness per one layer is 1 µm, a 100 µm-thick electrode sheet is obtained by repeating the filtration 100 times.

As described above, an electrode sheet is obtained as a laminate having multiple layers.

The above-obtained sheet is dried prior to being formed into a nonaqueous electrolyte secondary battery. To eliminate the influence of a residual solvent, it is preferred to dry the sheet under reduced pressure while applying heat thereon so that the solvent is completely removed.

<Nonaqueous Electrolyte Secondary Battery>

As a nonaqueous electrolyte secondary battery according to the embodiments of the present invention, a lithium-ion secondary battery is employed. To form a lithium-ion secondary battery, the above-described electrode sheet containing a TOT derivative and CNTs is brought into contact with a surface of a current collector so as to form a cathode, which is then set to face an anode with a separator settled between them. Then, the electrodes are encapsulated after a nonaqueous electrolyte is filled between the electrodes.

The current collector is formed using a thin plate made of aluminum, copper, nickel, iron, stainless steel or the like.

To set the electrode sheet in contact with a surface of a current collector, they may be adhered by exerting pressure using a pressing machine, or may be simply brought in contact with each other without any pressure exerted thereon.

Examples of the anode are lithium, lithium-containing alloys, lithium-carbon composite materials and the like. To suppress side reactions at the anode and to achieve excellent cycle characteristics, a lithium-carbon composite material is preferred; it is more preferred to use a pre-doped anode formed by inserting lithium ions into graphite in advance (see Patent Literature 3). A pre-doped anode is prepared when a sheet-type graphite is brought into contact with lithium metal in an electrolyte.

The nonaqueous electrolyte is not limited to any specific type, and is prepared by, for example, dissolving a lithium salt in a solvent. Examples of a lithium salt are lithium hexafluorophosphate, lithium tetrafluoroborate, lithium bis(trifluoromethanesulfonyl)imide, lithium trifluoromethanesulfonate, lithium bis(fluorosulfonyl)imide and the like. Examples of the solvent include propylene carbonate, ethylene carbonate, vinylene carbonate, dimethyl carbonate, diethyl carbonate, mixtures thereof, and the like.

The electrode sheet for a nonaqueous electrolyte secondary battery according to the embodiments of the present invention may also be used as an anode. In such cases, a cathode active material to be combined with such an anode can be a high potential compound such as $LiNi_{0.5}Mn_{1.5}O_4$, $Li_2CoPO_4F$, $FeF_3$, $NaFeF_3$, $FeOF$ and the like.

A lithium-ion secondary battery is described as the nonaqueous electrolyte secondary battery according to the embodiments of the present invention. However, the present invention is also applicable to be employed in a sodium-ion secondary battery, magnesium-ion secondary battery, or aluminum-ion secondary battery in addition to a lithium-ion secondary battery.

EXAMPLES

Examples of the present invention are described below, but the present invention is not limited to those examples.

A brominated TOT (X=Br; $Br_3TOT$) and unsubstituted TOT ($H_3TOT$) were synthesized. A brominated TOT ($Br_3TOT$) was synthesized according to the method described in Non-patent Literature 1. Using 2-iodotoluene as the starting material, an unsubstituted TOT ($H_3TOT$) was synthesized the same as $Br_3TOT$. The film thickness of the electrode sheet was measured using a length gauge MT1281 made by Heidenhain Corporation. Multi-walled CNTs were purchased from Meijo Nano Carbon Co., Ltd. The aspect ratio was 100~1000.

Example 1 (Forming $H_3TOT$ Lithium-Ion Secondary Battery)

Into 2.52 grams of 1 wt. % multi-walled CNT ethanol dispersion, 2.8 mg of $H_3TOT$ was added and stirred for an hour while ultrasonic waves were being irradiated. The dispersion mixture was divided into 50 equal portions, and each portion of the divided dispersion mixture was filtrated under reduced pressure through a membrane filter with a pore size of 0.2 µm, resulting in 50 layers of lamination formed on the filter. Then, the laminated residue was dried at 70° C. for 90 minutes. Accordingly obtained was a CNT buckypaper cathode sheet with $H_3TOT$ dispersed therein.

The film thickness of the above cathode sheet was 69 µm. The content of $H_3TOT$ in the cathode sheet is 10 wt. %.

The cathode sheet was further dried at 80° C. for 12 hours under reduced pressure prior to being formed into a battery.

A lithium-ion secondary battery was formed as follows using the above-obtained cathode sheet. First, the battery was set to have the shape of a CR2032. Then, an anode-side exterior cladding, stainless steel metal plate (anode current collector), lithium foil (anode), separator made of poly(propylene) porous film, the above cathode sheet (cathode), stainless steel plate (cathode current collector), spring, and cathode-side exterior cladding were laminated in that order. Next, an electrolyte was filled inside the exterior claddings, which were then caulked. Accordingly, a lithium-ion secondary battery was obtained.

As for the electrolyte, $LiPF_6$ was dissolved in ethylene carbonate/diethyl carbonate (volume ratio 3:7) to have a concentration of 1.0 M.

The battery was set in a charge/discharge tester TOSCAT-3100 made by Toyo Systems Inc., and charge/discharge cycles were repeated in a voltage range of 1.4~3.8 V and under a current rate of 1 C. FIG. 1 shows the discharge capacity per unit weight of $H_3TOT$ relative to the number of charge/discharge cycles. Based on the results shown in FIG. 1, it is found that a discharge capacity equivalent to the theoretical capacity of 334 mAh/g was maintained for 200 cycles or more.

<Preparing Pre-Doped Anode Sheet>

Using a planetary mixer, 540 mg of powdered graphite, 1.2 grams of 5 wt. % N-methylpyrrolidone solution of poly(vinylidene fluoride), and 0.3 mL of N-methylpyrrolidone were mixed and stirred for 10 minutes. The mixture was cast on a copper plate using a bar coater with a clearance of 30 μm, dried at 120° C. for an hour under reduced pressure, and then pressed at 800 kg/cm² using a roll press. Accordingly, an anode sheet was obtained.

Lithium ion was inserted into the anode sheet by bringing the anode sheet and lithium foil into contact with each other in an electrolyte. Accordingly, a pre-doped anode was formed. As for the electrolyte, $LiPF_6$ was dissolved in ethylene carbonate/diethyl carbonate (volume ratio 3:7) to have a concentration of 1.0 M.

Examples 2~28 (Forming $H_3TOT$ Lithium-Ion Secondary Battery)

A cathode sheet was produced using $H_3TOT$ the same as in Example 1, and a lithium foil or the above-obtained pre-doped anode was used as the anode to form a lithium-ion secondary battery the same as in Example 1. Evaluations were conducted accordingly.

For charge/discharge testing, Examples 2~25 used a charge/discharge tester TOSCAT-3100, made by Toyo Systems, the same as in Example 1, whereas Example 26 used VMP-3M made by Bio-Logic Science Instruments, and Examples 27 and 28 used TOSCAT-3300 made by Toyo Systems.

Production conditions and charge/discharge conditions are shown in Table 1.

TABLE 1

Figure 2:
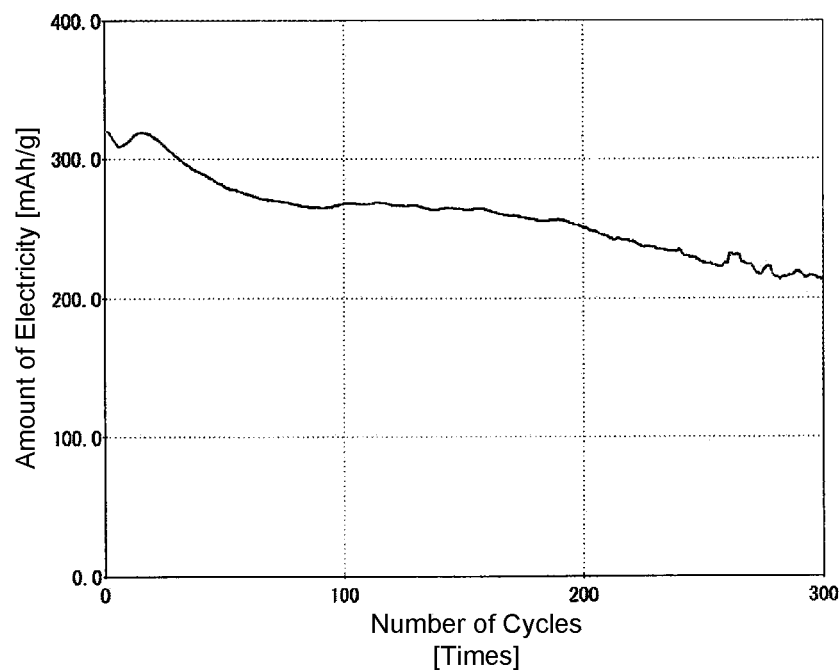
FIG. 2 is a graph showing changes in the discharge capacity of a lithium-ion secondary battery relative to the number of charge/discharge cycles according to Example 2.
Figure 3:
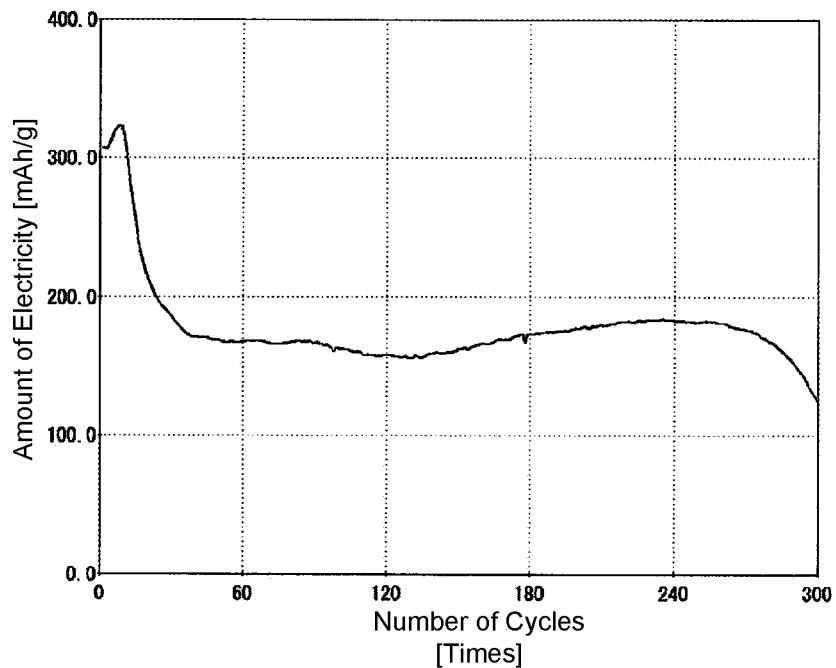
FIG. 3 is a graph showing changes in the discharge capacity of a lithium-ion secondary battery relative to the number of charge/discharge cycles according to Example 3.
Figure 4:
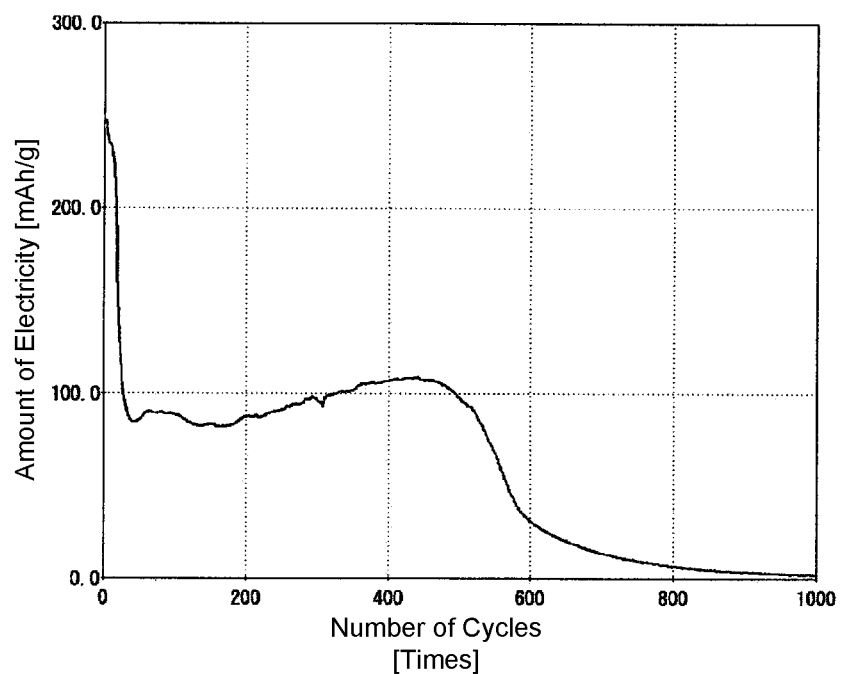
FIG. 4 is a graph showing changes in the discharge capacity of a lithium-ion secondary battery relative to the number of charge/discharge cycles according to Example 4.
Figure 5:
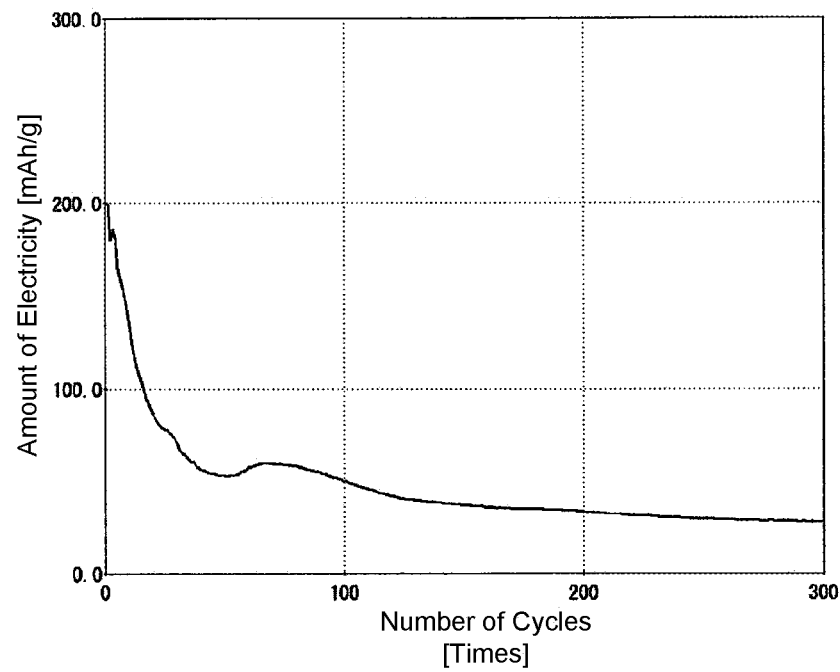
FIG. 5 is a graph showing changes in the discharge capacity of a lithium-ion secondary battery relative to the number of charge/discharge cycles according to Example 5.
Figure 6:
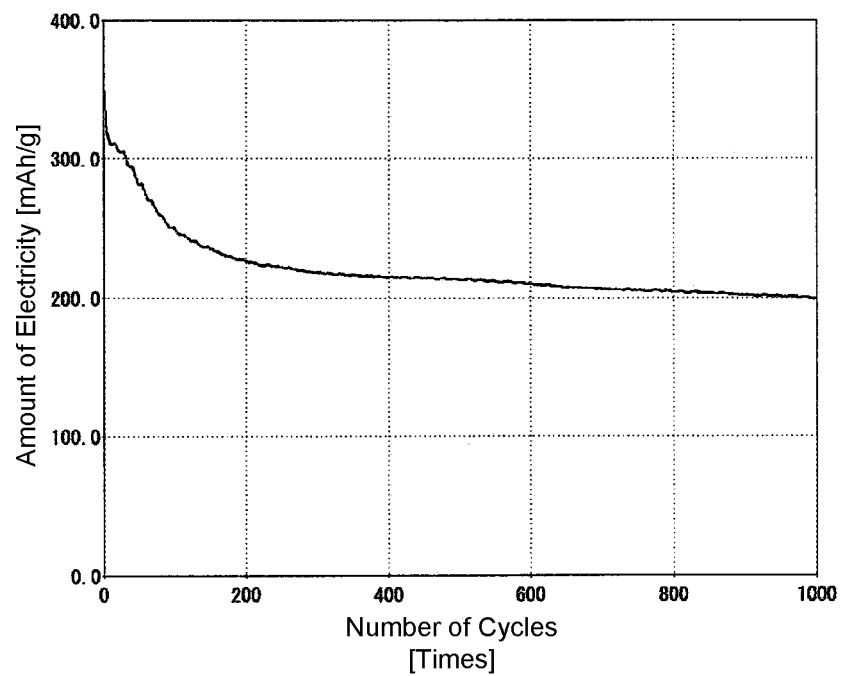
FIG. 6 is a graph showing changes in the discharge capacity of a lithium-ion secondary battery relative to the number of charge/discharge cycles according to Example 6.
Figure 7:
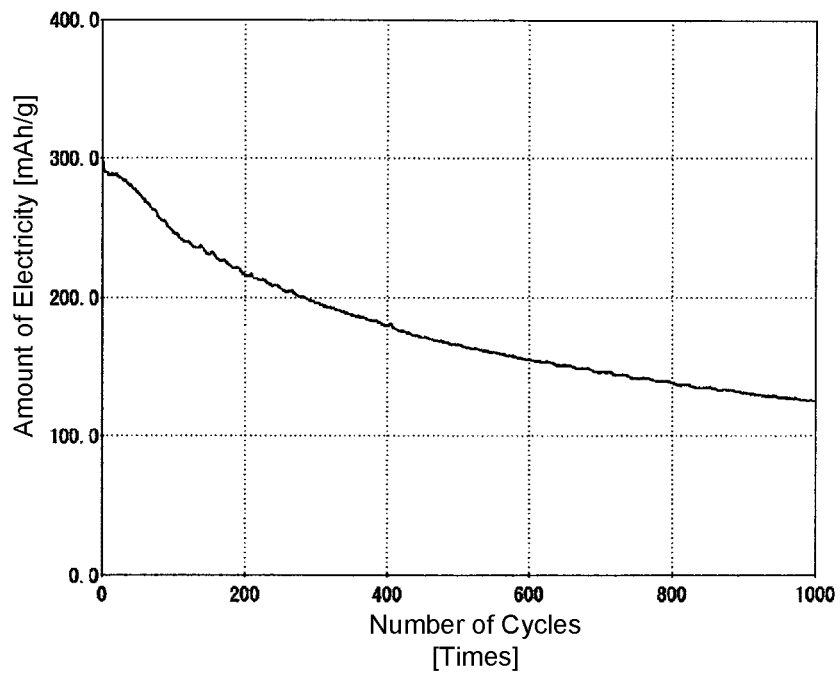
FIG. 7 is a graph showing changes in the discharge capacity of a lithium-ion secondary battery relative to the number of charge/discharge cycles according to Example 7.
Figure 8:
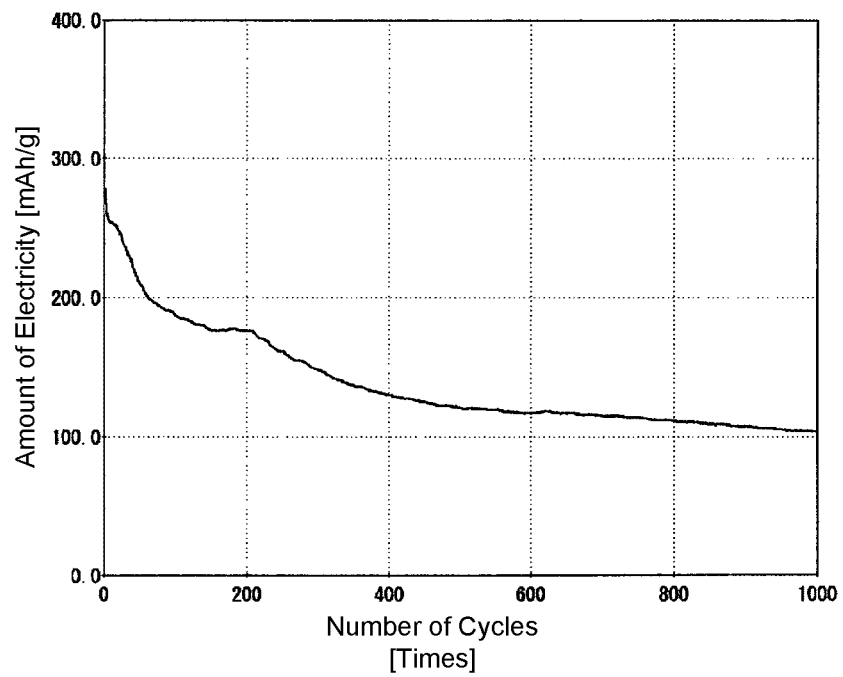
FIG. 8 is a graph showing changes in the discharge capacity of a lithium-ion secondary battery relative to the number of charge/discharge cycles according to Example 8.
Figure 9:
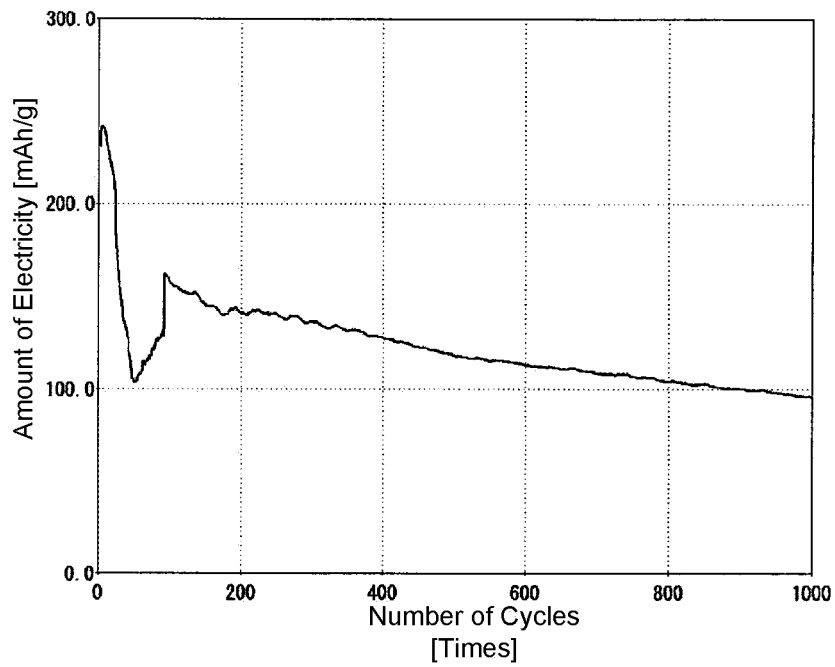
FIG. 9 is a graph showing changes in the discharge capacity of a lithium-ion secondary battery relative to the number of charge/discharge cycles according to Example 9.
Figure 10:
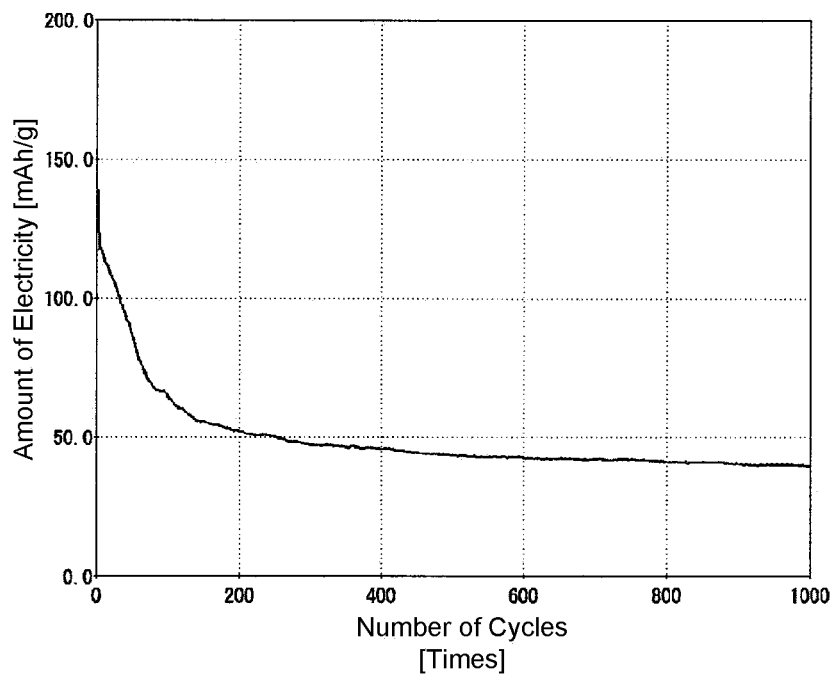
FIG. 10 is a graph showing changes in the discharge capacity of a lithium-ion secondary battery relative to the number of charge/discharge cycles according to Example 10.
Figure 11:
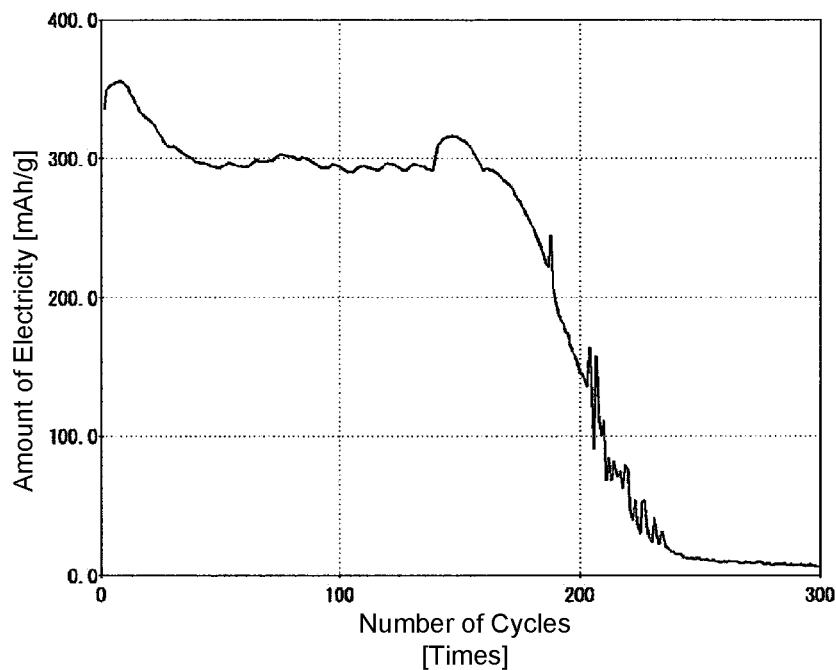
FIG. 11 is a graph showing changes in the discharge capacity of a lithium-ion secondary battery relative to the number of charge/discharge cycles according to Example 11.
Figure 12:
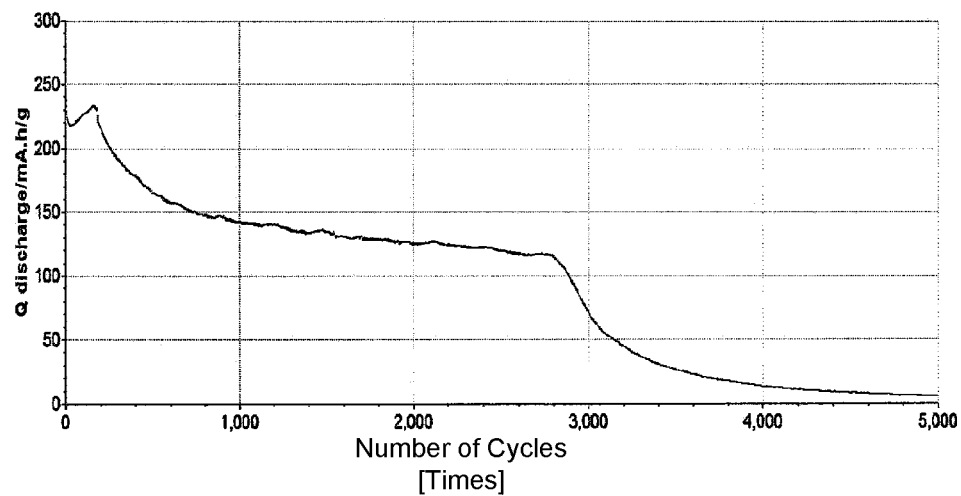
FIG. 12 is a graph showing changes in the discharge capacity of a lithium-ion secondary battery relative to the number of charge/discharge cycles according to Example 12.
Figure 13:
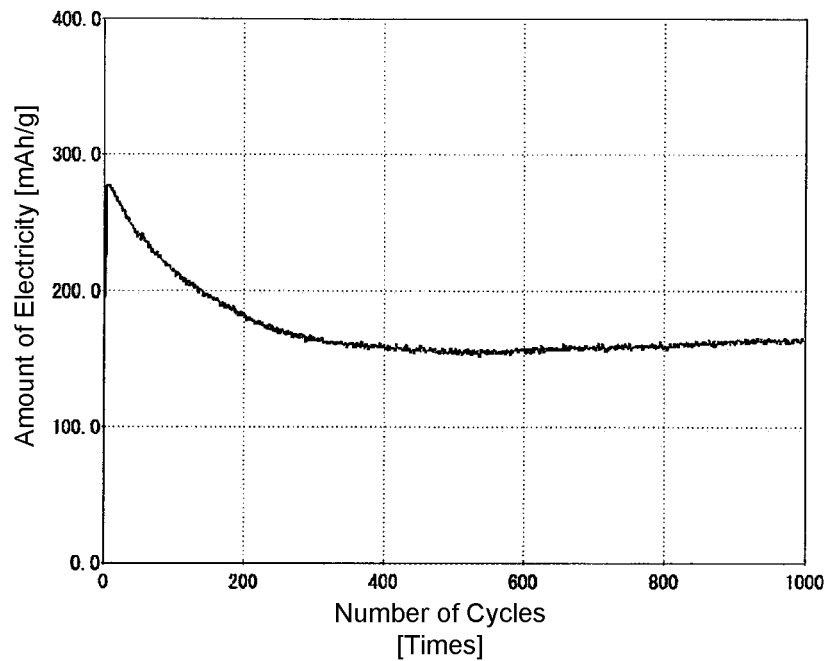
FIG. 13 is a graph showing changes in the discharge capacity of a lithium-ion secondary battery relative to the number of charge/discharge cycles according to Example 13.
Figure 14:
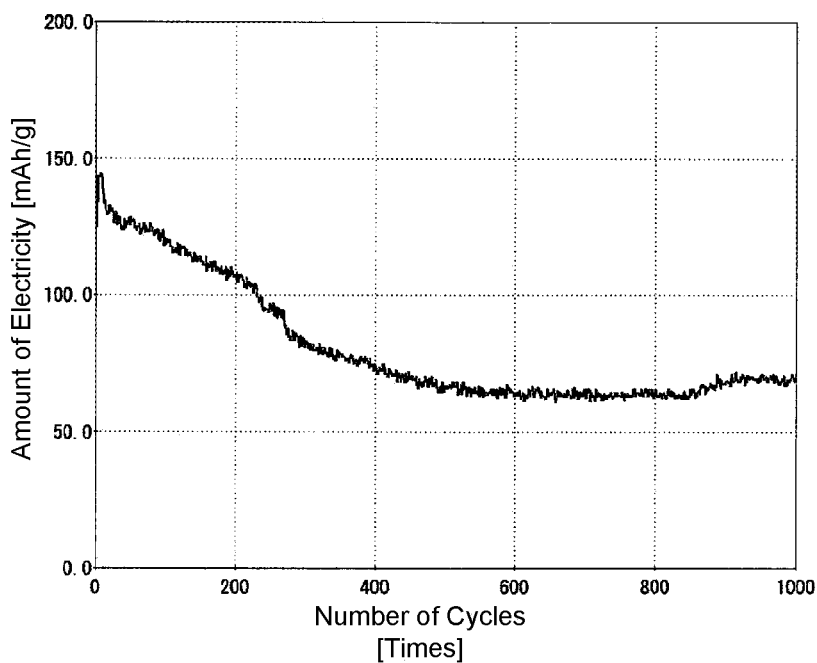
FIG. 14 is a graph showing changes in the discharge capacity of a lithium-ion secondary battery relative to the number of charge/discharge cycles according to Example 14.
Figure 15:
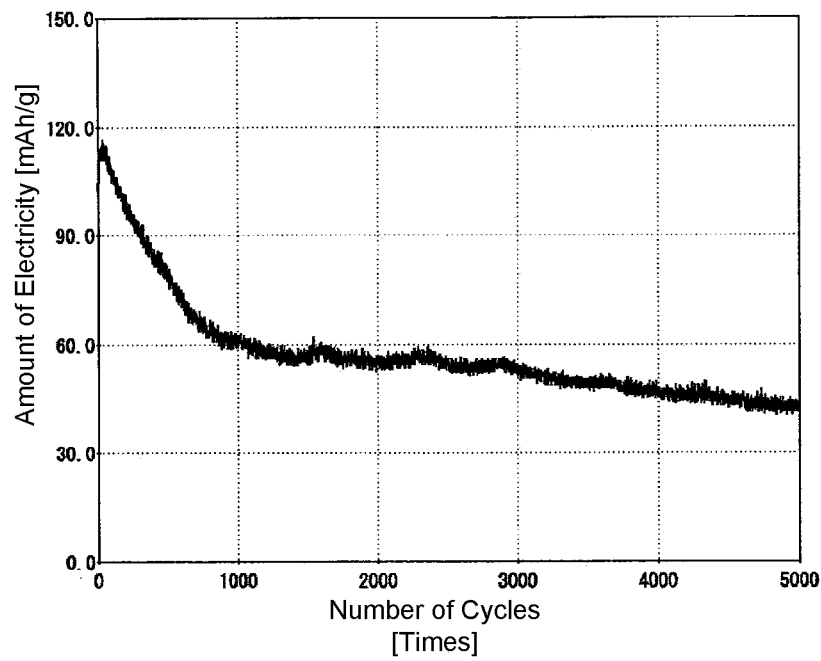
FIG. 15 is a graph showing changes in the discharge capacity of a lithium-ion secondary battery relative to the number of charge/discharge cycles according to Example 15.
Figure 16:
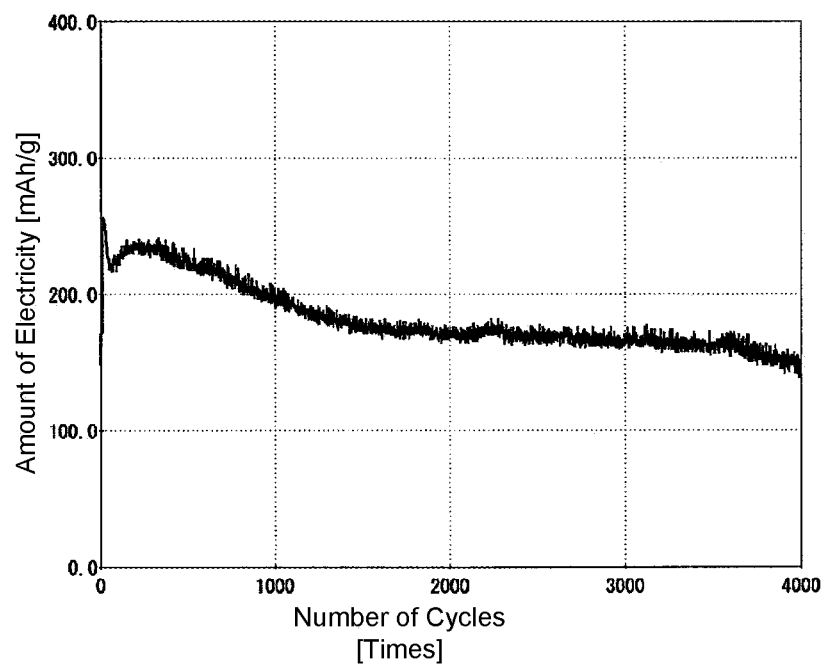
FIG. 16 is a graph showing changes in the discharge capacity of a lithium-ion secondary battery relative to the number of charge/discharge cycles according to Example 16.
Figure 17:
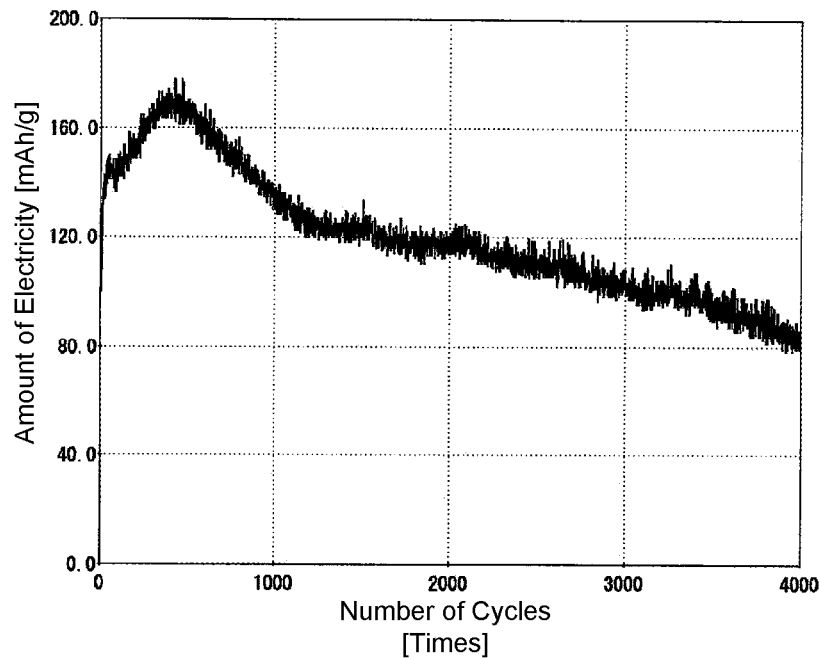
FIG. 17 is a graph showing changes in the discharge capacity of a lithium-ion secondary battery relative to the number of charge/discharge cycles according to Example 17.
Figure 18:
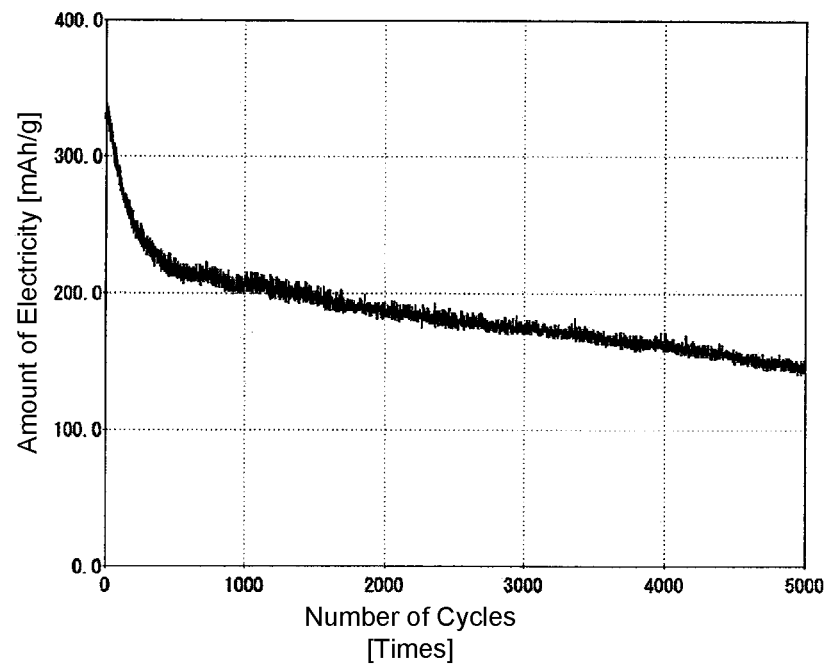
FIG. 18 is a graph showing changes in the discharge capacity of a lithium-ion secondary battery relative to the number of charge/discharge cycles according to Example 18.
Figure 19:
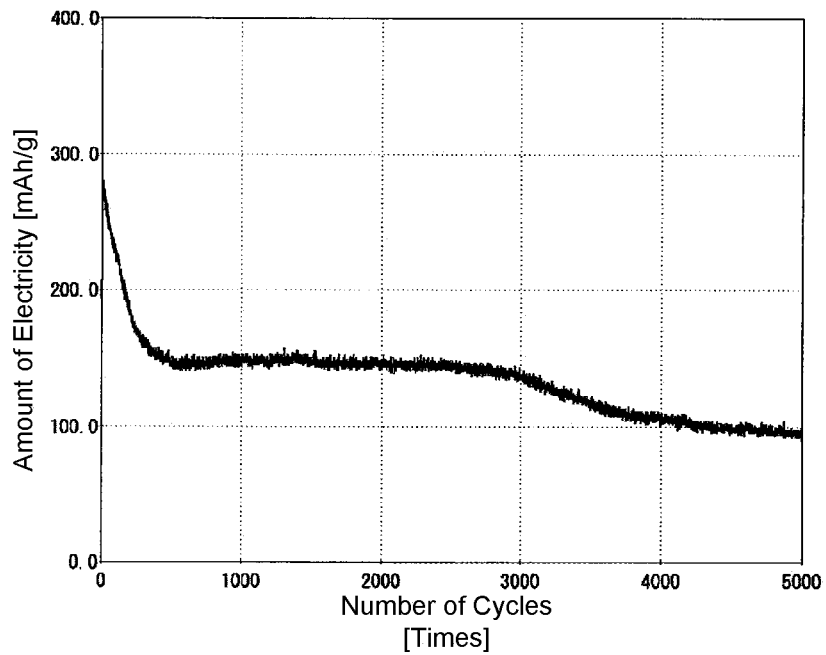
FIG. 19 is a graph showing changes in the discharge capacity of a lithium-ion secondary battery relative to the number of charge/discharge cycles according to Example 19.
Figure 20:
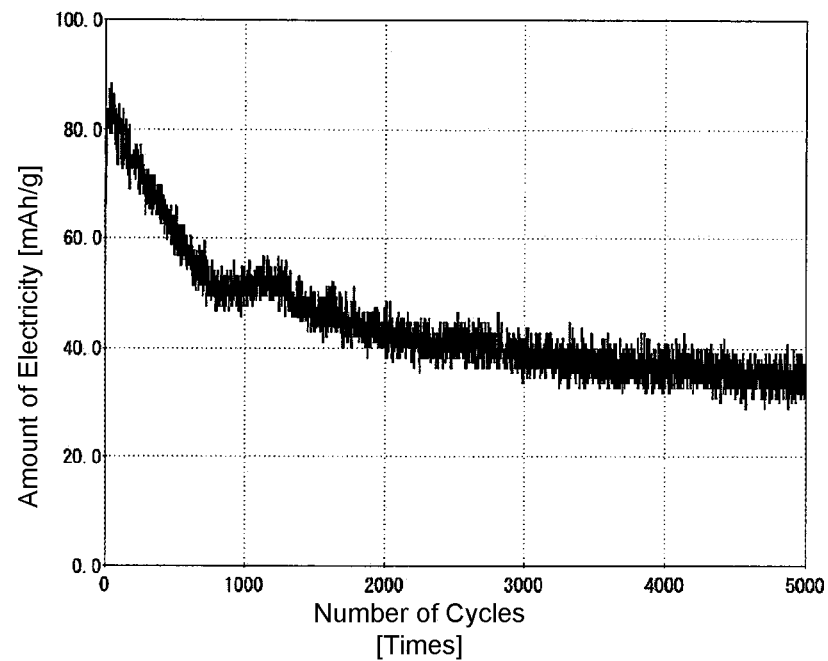
FIG. 20 is a graph showing changes in the discharge capacity of a lithium-ion secondary battery relative to the number of charge/discharge cycles according to Example 20.
Figure 21:
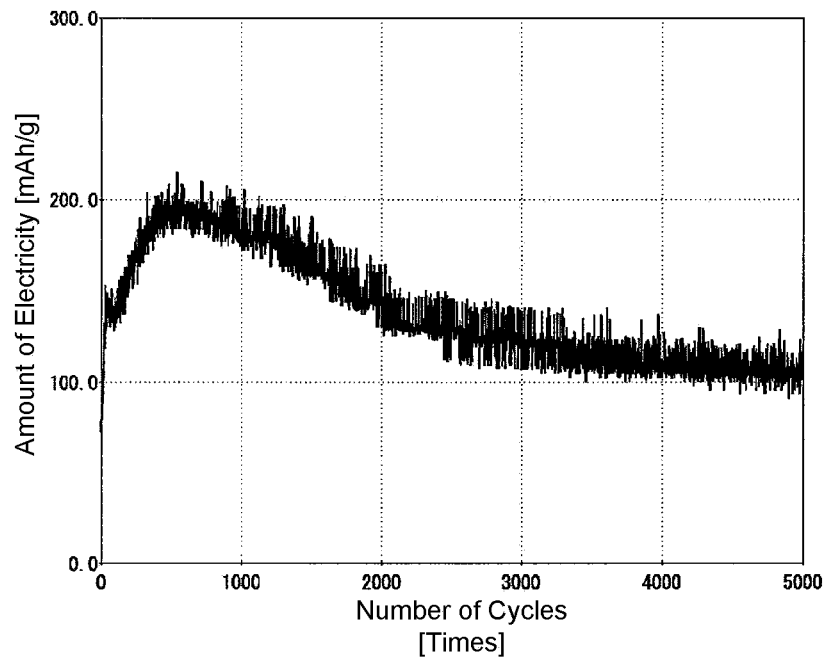
FIG. 21 is a graph showing changes in the discharge capacity of a lithium-ion secondary battery relative to the number of charge/discharge cycles according to Example 21.
Figure 22:
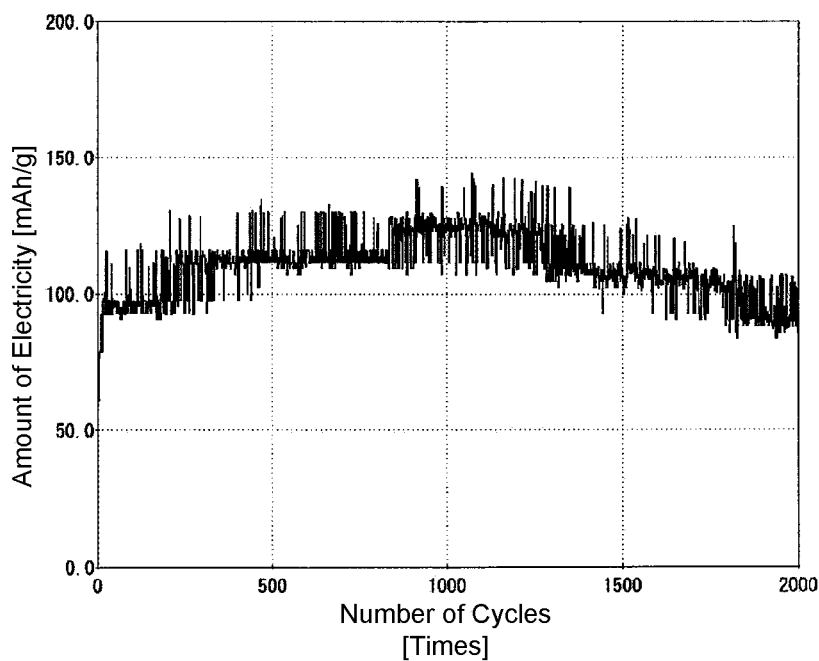
FIG. 22 is a graph showing changes in the discharge capacity of a lithium-ion secondary battery relative to the number of charge/discharge cycles according to Example 22.
Figure 23:
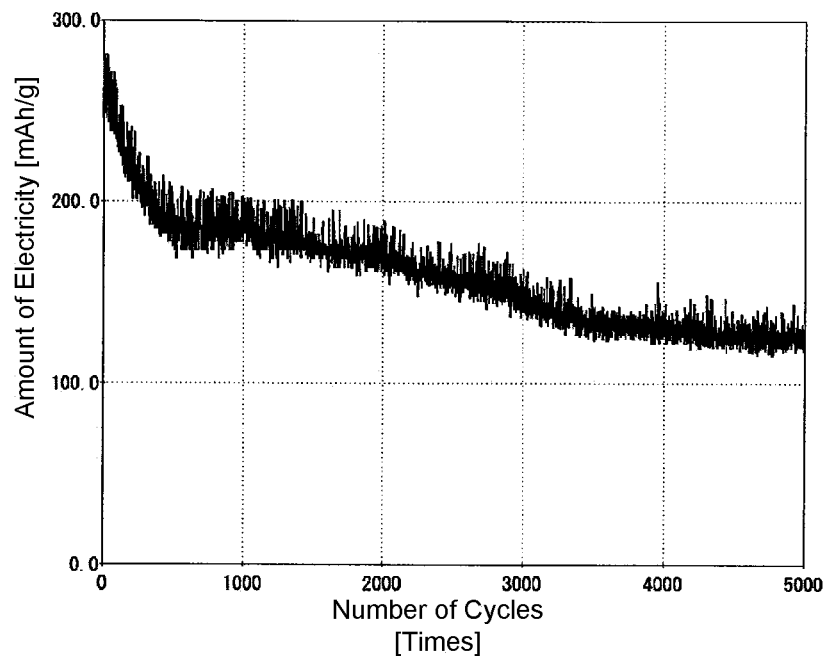
FIG. 23 is a graph showing changes in the discharge capacity of a lithium-ion secondary battery relative to the number of charge/discharge cycles according to Example 23.
Figure 24:
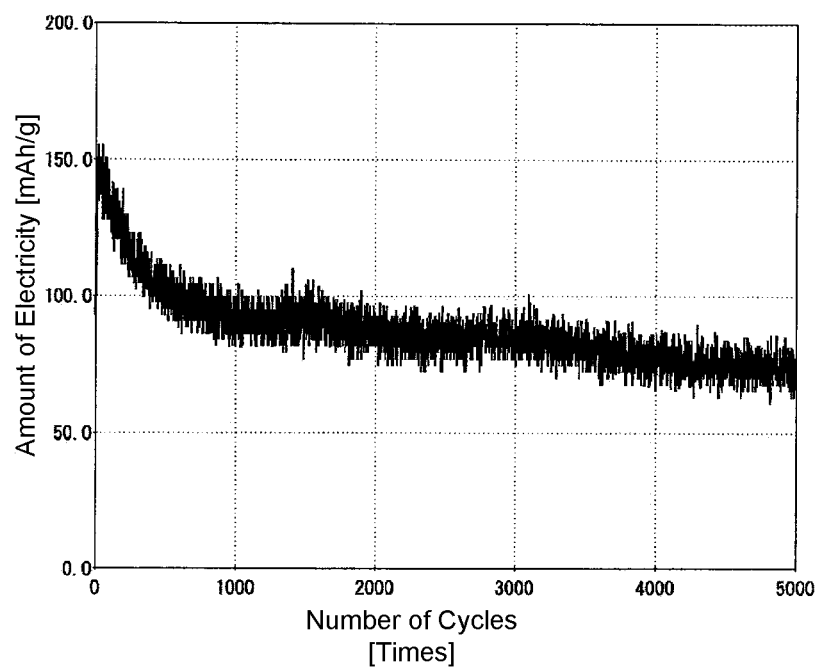
FIG. 24 is a graph showing changes in the discharge capacity of a lithium-ion secondary battery relative to the number of charge/discharge cycles according to Example 24.
Figure 25:
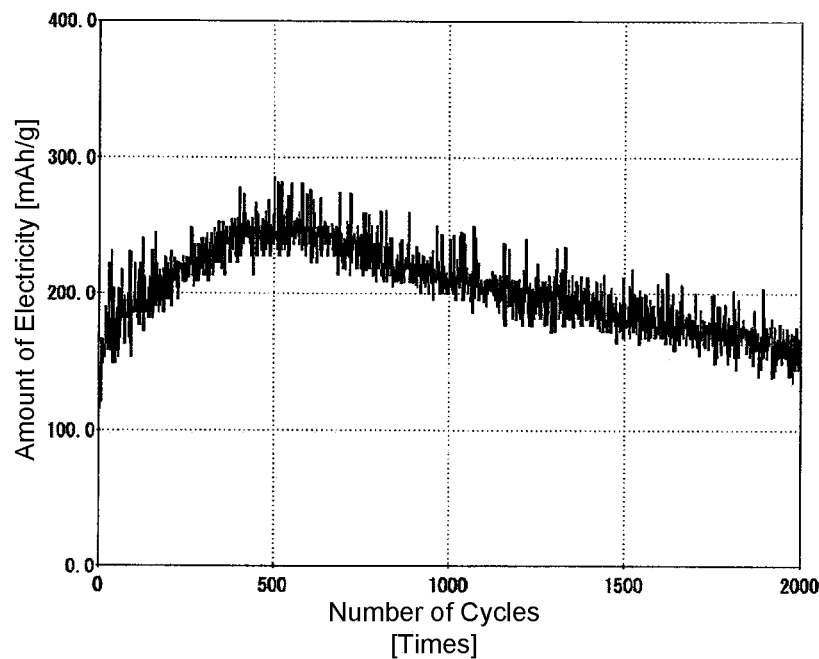
FIG. 25 is a graph showing changes in the discharge capacity of a lithium-ion secondary battery relative to the number of charge/discharge cycles according to Example 25.
Figure 26:
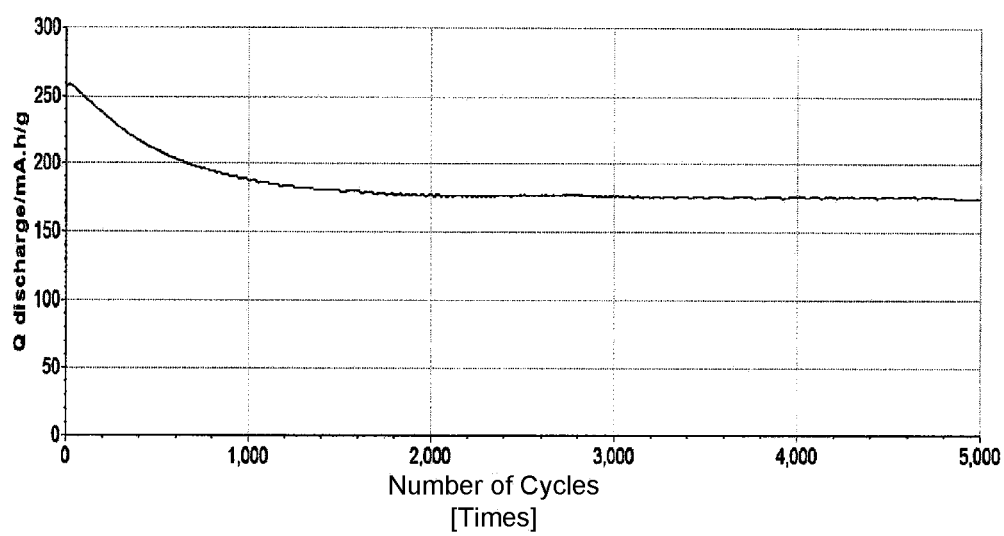
FIG. 26 is a graph showing changes in the discharge capacity of a lithium-ion secondary battery relative to the number of charge/discharge cycles according to Example 26.
Figure 27:
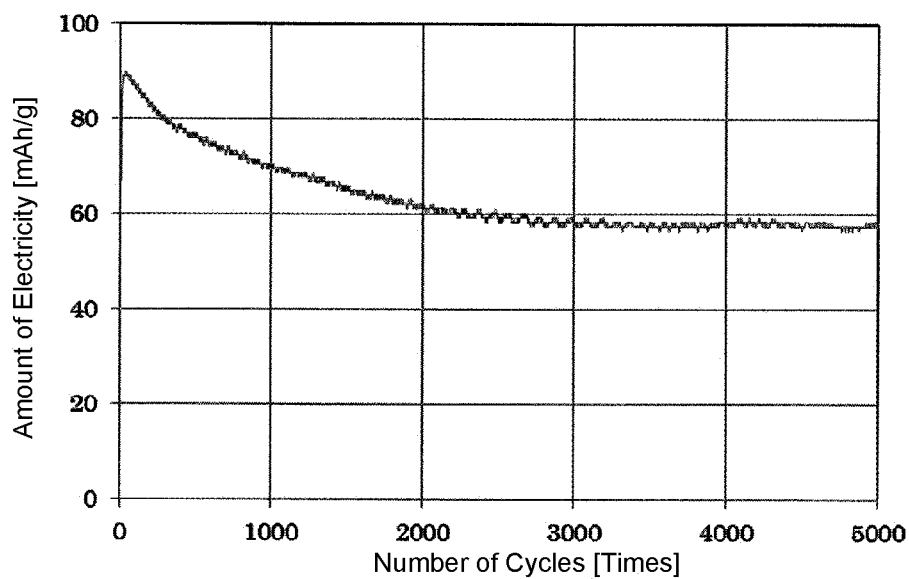
FIG. 27 is a graph showing changes in the discharge capacity of a lithium-ion secondary battery relative to the number of charge/discharge cycles according to Example 27.
Figure 28:
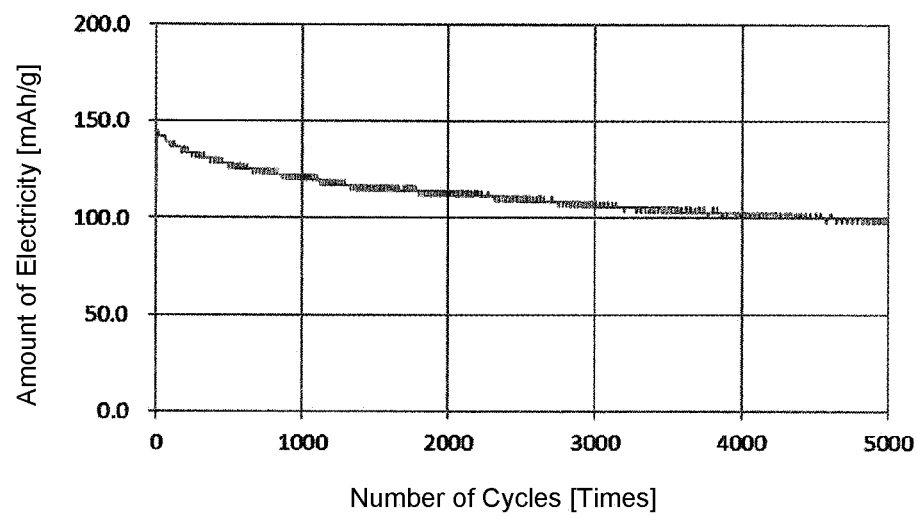
FIG. 28 is a graph showing changes in the discharge capacity of a lithium-ion secondary battery relative to the number of charge/discharge cycles according to Example 28.

| Examples | $H_3TOT$ (wt. %) | Positive electrode film thickness (μm) | Negative electrode | Current rate (C) | Voltage range (V) | Discharge capacity |
|---|---|---|---|---|---|---|
| 1 | 10 | 69 | lithium foil | 1 | 1.4-3.8 | FIG. 1 |
| 2 | 20 | 63 | lithium foil | 1 | 1.4-3.8 | FIG. 2 |
| 3 | 40 | 44 | lithium foil | 1 | 1.4-3.8 | FIG. 3 |
| 4 | 60 | 65 | lithium foil | 1 | 1.4-3.8 | FIG. 4 |
| 5 | 80 | 43 | lithium foil | 1 | 1.4-4.0 | FIG. 5 |
| 6 | 10 | 68 | pre-doped | 1 | 1.4-3.8 | FIG. 6 |
| 7 | 20 | 60 | pre-doped | 1 | 1.4-3.8 | FIG. 7 |
| 8 | 40 | 48 | pre-doped | 1 | 1.4-3.8 | FIG. 8 |
| 9 | 60 | 43 | pre-doped | 1 | 1.4-3.8 | FIG. 9 |
| 10 | 80 | 43 | pre-doped | 1 | 1.4-3.8 | FIG. 10 |
| 11 | 9 | 72 | lithium foil | 1 | 1.4-4.0 | FIG. 11 |
| 12 | 20 | 60 | lithium foil | 10 | 1.4-3.8 | FIG. 12 |
| 13 | 20 | 53 | pre-doped | 10 | 1.4-3.8 | FIG. 13 |
| 14 | 40 | 48 | pre-doped | 10 | 1.4-3.8 | FIG. 14 |
| 15 | 60 | 43 | pre-doped | 10 | 1.4-3.8 | FIG. 15 |
| 16 | 10 | 61 | lithium foil | 20 | 1.4-3.8 | FIG. 16 |
| 17 | 20 | 65 | lithium foil | 20 | 1.4-3.8 | FIG. 17 |
| 18 | 10 | 68 | pre-doped | 20 | 1.4-3.8 | FIG. 18 |
| 19 | 20 | 53 | pre-doped | 20 | 1.4-3.8 | FIG. 19 |
| 20 | 40 | 48 | pre-doped | 20 | 1.4-3.8 | FIG. 20 |
| 21 | 10 | 71 | lithium foil | 50 | 1.4-3.8 | FIG. 21 |
| 22 | 20 | 65 | lithium foil | 50 | 1.4-3.8 | FIG. 22 |
| 23 | 10 | 68 | pre-doped | 50 | 1.4-3.8 | FIG. 23 |
| 24 | 20 | 53 | pre-doped | 50 | 1.4-3.8 | FIG. 24 |
| 25 | 10 | 68 | lithium foil | 100 | 1.4-3.8 | FIG. 25 |
| 26 | 10 | 68 | pre-doped | 100 | 1.4-3.8 | FIG. 26 |
| 27 | 20 | 53 | pre-doped | 100 | 1.4-3.8 | FIG. 27 |
| 28 | 10 | 60 | pre-doped | 300 | 1.4-3.8 | FIG. 28 |

FIG. 1~FIG. 28 are graphs showing their respective discharge capacities. Regarding the tests conducted at charge/discharge rate of 1 C, when the results in FIG. 1~FIG. 5 (lithium-foil anode) were compared with those in FIG. 6~FIG. 10 (pre-doped anode), it was found that batteries formed with a pre-doped anode exhibited excellent discharge capacity and cycle characteristics. The same tendency was observed when charge/discharge rates were increased (FIG. 11~FIG. 28). Even under high-speed charge/discharge cycles of 100 C, the secondary battery related to the present invention maintains a discharge capacity of 175 mAh/g after 5000 cycles, thus exhibiting excellent high-speed charge/discharge characteristics and cycle characteristics (FIG. 26). Moreover, the battery maintains a capacity of 100 mAh/g after 5000 cycles under a condition of 300 C (FIG. 28).

Figure 29:
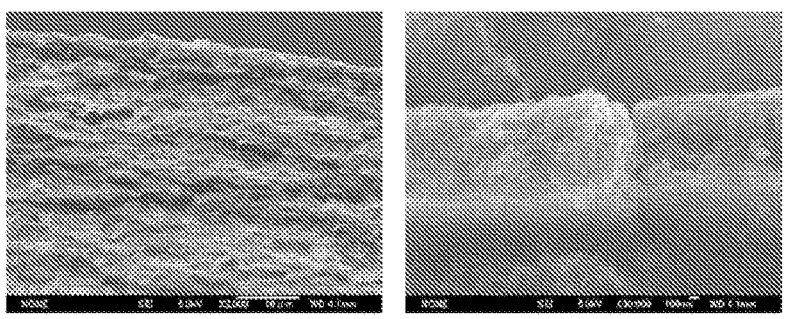
FIG. 29 shows cross-sectional scanning electron microscopy (SEM) images of a positive-electrode sheet used in a lithium-ion secondary battery of Example 11.

In addition, FIG. 29 shows SEM cross-sectional images of the cathode sheet in Example 11. In FIG. 29, the left side is a low-magnified image, and the right side is a high-magnified image. From the low-magnified image, it is confirmed that CNTs are laminated in layers, and from the high-magnified image, a particulate TOT is confirmed to be attached to the layered CNTs.

Examples 29~40 (Forming $Br_3TOT$ Lithium-Ion Secondary Battery)

A cathode sheet was formed the same as in Example 1 except that $H_3TOT$ was replaced with $Br_3TOT$. Lithium ion batteries were each produced by combining the cathode with a lithium-foil or pre-doped anode. Charge/discharge characters were evaluated by using a charge/discharge tester TOSCAT-3100, made by Toyo Systems. Detailed production conditions and charge/discharge conditions are shown in Table 2, and measured discharge characteristics are shown in FIG. 30~FIG. 41. A decrease in the discharge capacity is observed as the content of $Br_3TOT$ is increased, but the batteries showed excellent cycle characteristics even at a charge/discharge rate of 20 C.

TABLE 2

Figure 30:
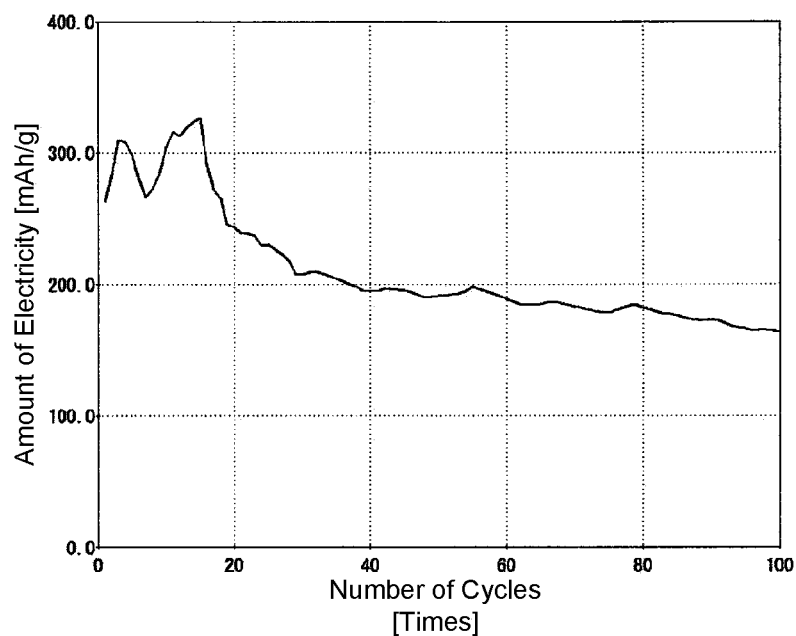
FIG. 30 is a graph showing changes in the discharge capacity of a lithium-ion secondary battery relative to the number of charge/discharge cycles according to Example 29.
Figure 31:
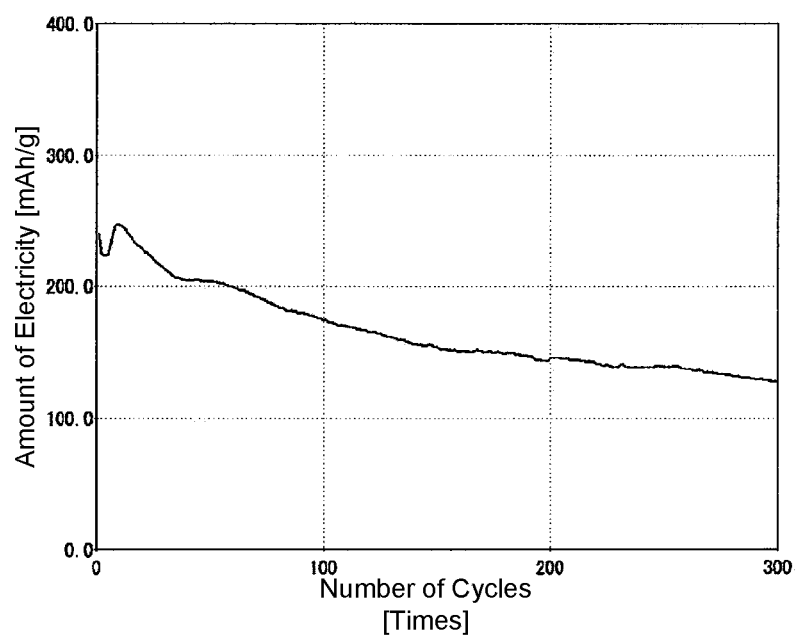
FIG. 31 is a graph showing changes in the discharge capacity of a lithium-ion secondary battery relative to the number of charge/discharge cycles according to Example 30.
Figure 32:
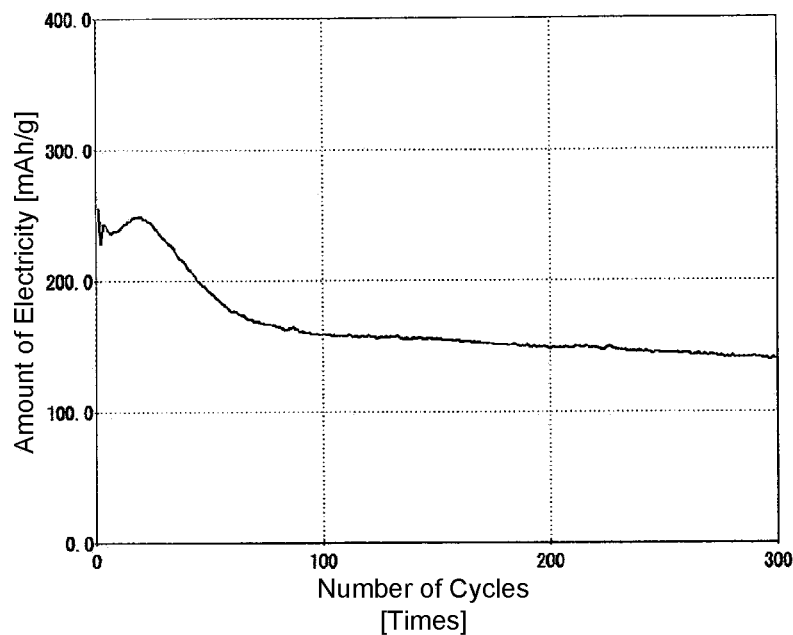
FIG. 32 is a graph showing changes in the discharge capacity of a lithium-ion secondary battery relative to the number of charge/discharge cycles according to Example 31.
Figure 33:
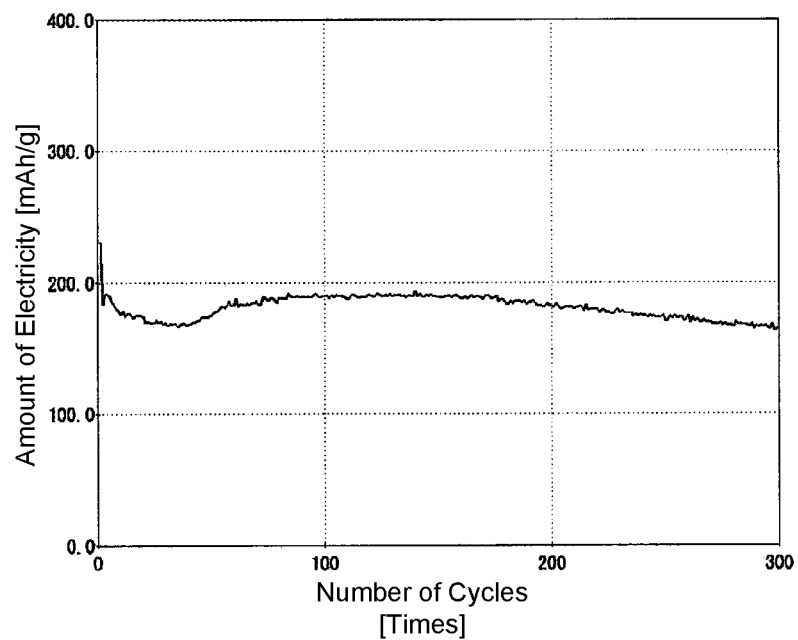
FIG. 33 is a graph showing changes in the discharge capacity of a lithium-ion secondary battery relative to the number of charge/discharge cycles according to Example 32.
Figure 34:
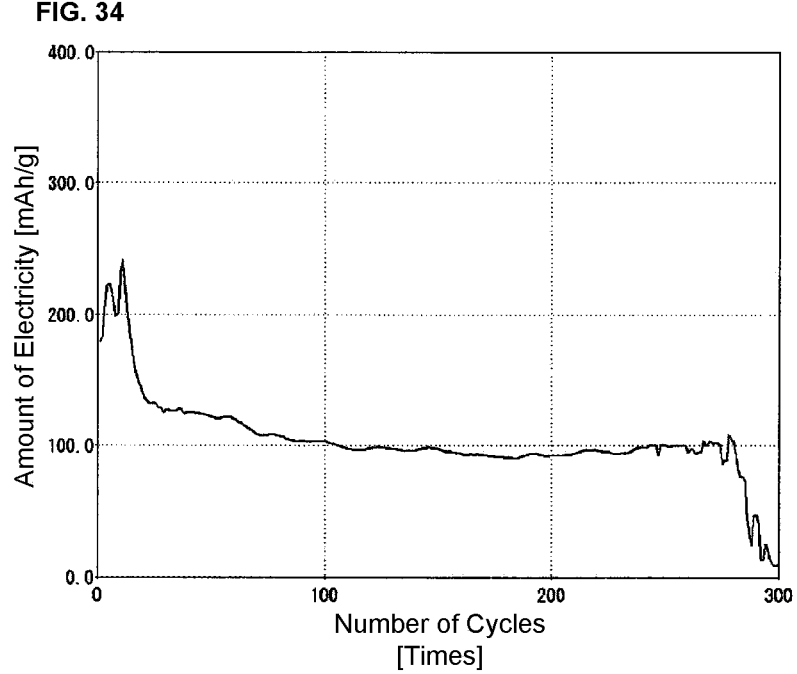
FIG. 34 is a graph showing changes in the discharge capacity of a lithium-ion secondary battery relative to the number of charge/discharge cycles according to Example 33.
Figure 35:
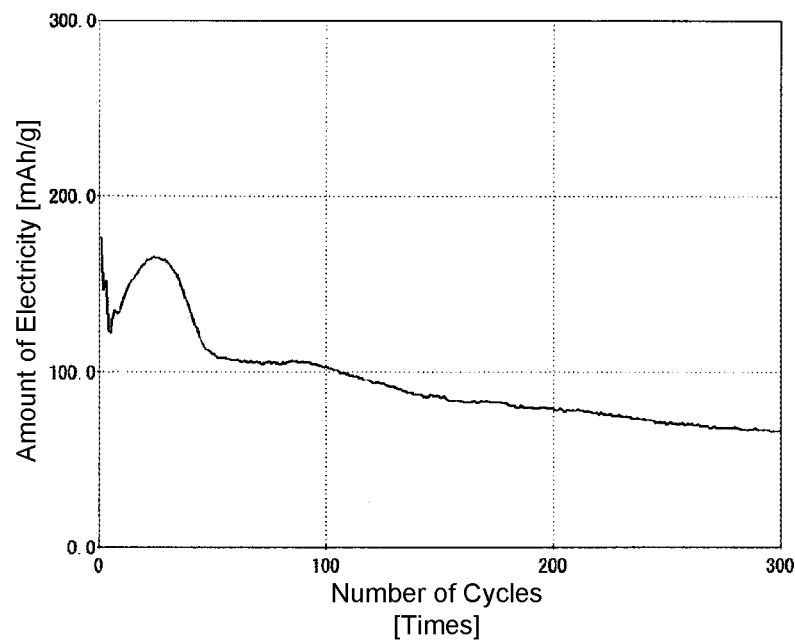
FIG. 35 is a graph showing changes in the discharge capacity of a lithium-ion secondary battery relative to the number of charge/discharge cycles according to Example 34.
Figure 36:
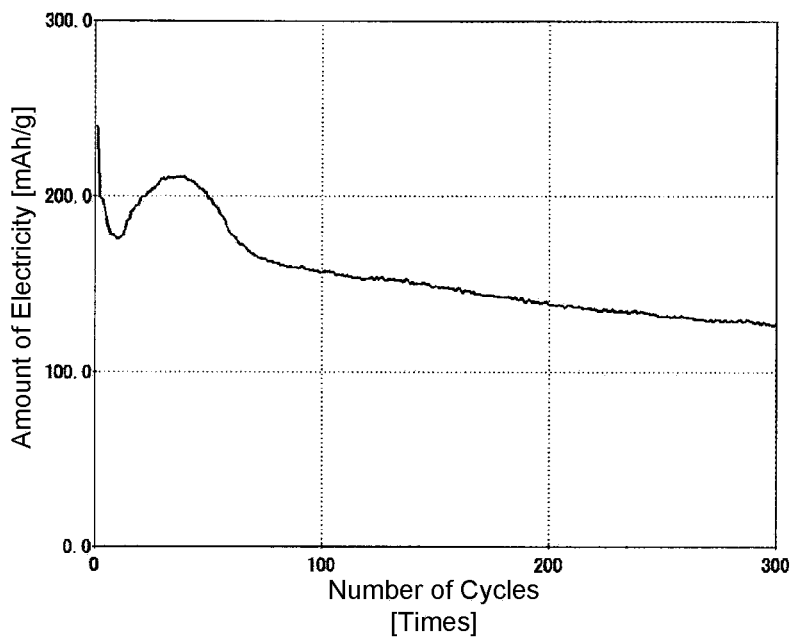
FIG. 36 is a graph showing changes in the discharge capacity of a lithium-ion secondary battery relative to the number of charge/discharge cycles according to Example 35.
Figure 37:
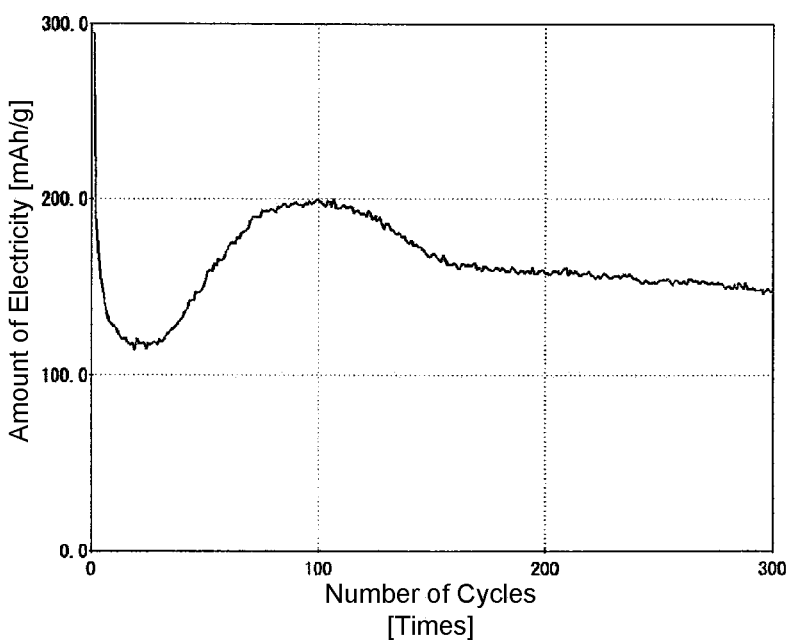
FIG. 37 is a graph showing changes in the discharge capacity of a lithium-ion secondary battery relative to the number of charge/discharge cycles according to Example 36.
Figure 38:
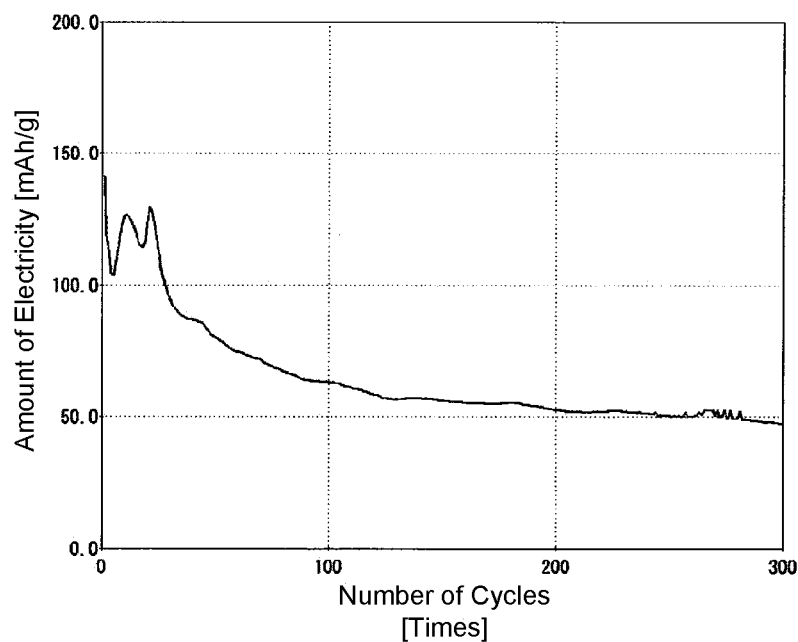
FIG. 38 is a graph showing changes in the discharge capacity of a lithium-ion secondary battery relative to the number of charge/discharge cycles according to Example 37.
Figure 39:
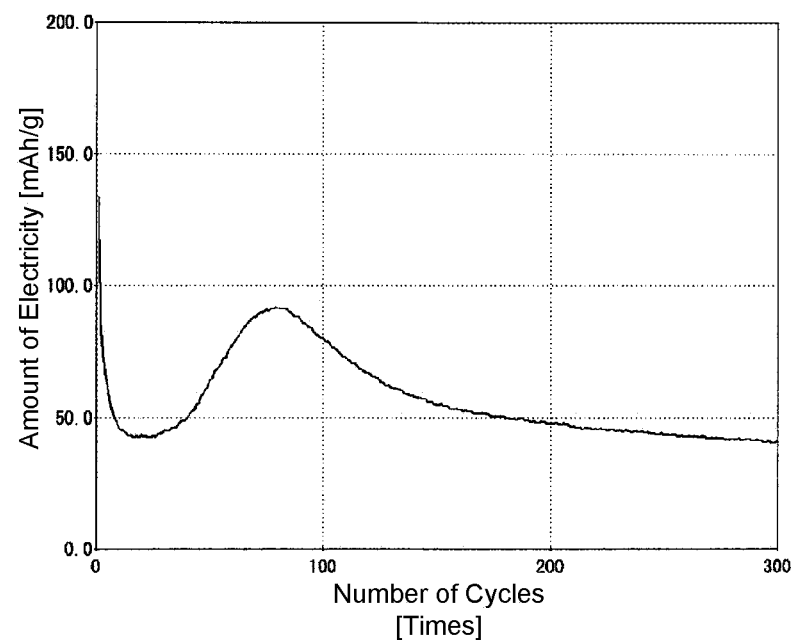
FIG. 39 is a graph showing changes in the discharge capacity of a lithium-ion secondary battery relative to the number of charge/discharge cycles according to Example 38.
Figure 40:
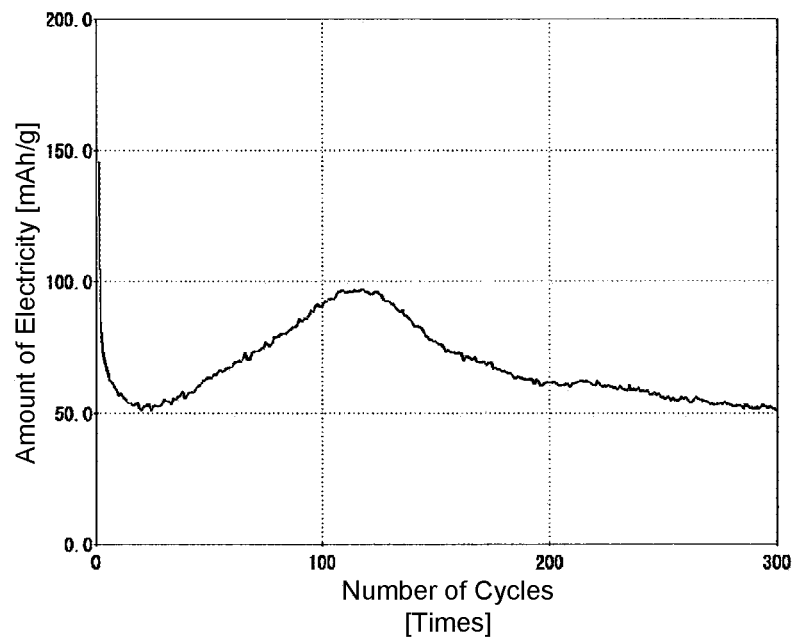
FIG. 40 is a graph showing changes in the discharge capacity of a lithium-ion secondary battery relative to the number of charge/discharge cycles according to Example 39.
Figure 41:
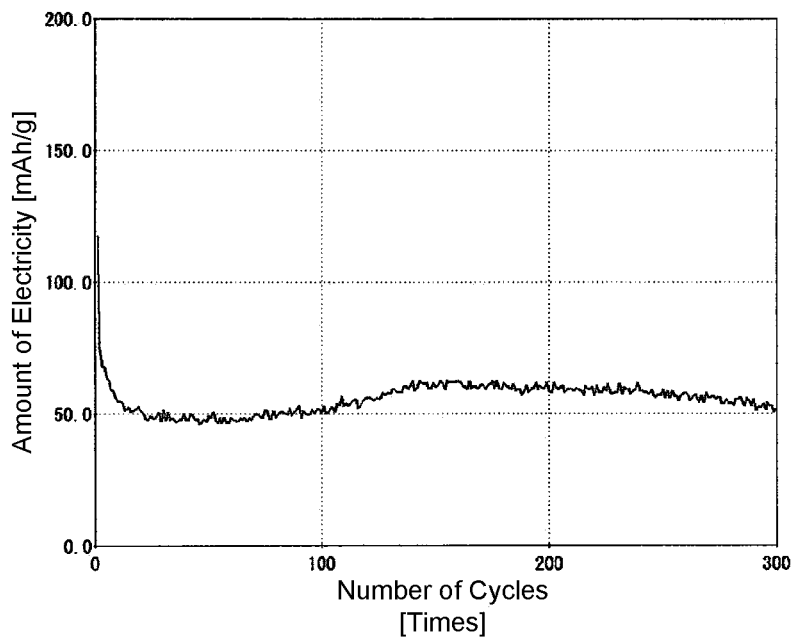
FIG. 41 is a graph showing changes in the discharge capacity of a lithium-ion secondary battery relative to the number of charge/discharge cycles according to Example 40.

| Examples | $Br_3TOT$ (wt. %) | Positive electrode film thickness (μm) | Negative electrode | Current rate (C) | Voltage range (V) | Discharge capacity |
|---|---|---|---|---|---|---|
| 29 | 20 | 50 | lithium foil | 1 | 1.4-3.8 | FIG. 30 |
| 30 | 20 | 50 | lithium foil | 5 | 1.4-3.8 | FIG. 31 |
| 31 | 20 | 50 | lithium foil | 10 | 1.4-3.8 | FIG. 32 |
| 32 | 20 | 50 | lithium foil | 20 | 1.4-3.8 | FIG. 33 |
| 33 | 40 | 44 | lithium foil | 1 | 1.4-3.8 | FIG. 34 |
| 34 | 40 | 44 | lithium foil | 5 | 1.4-3.8 | FIG. 35 |
| 35 | 40 | 44 | lithium foil | 10 | 1.4-3.8 | FIG. 36 |
| 36 | 40 | 44 | lithium foil | 20 | 1.4-3.8 | FIG. 37 |
| 37 | 60 | 40 | lithium foil | 1 | 1.4-3.8 | FIG. 38 |
| 38 | 60 | 40 | lithium foil | 5 | 1.4-3.8 | FIG. 39 |
| 39 | 60 | 40 | lithium foil | 10 | 1.4-3.8 | FIG. 40 |
| 40 | 60 | 40 | lithium foil | 20 | 1.4-3.8 | FIG. 41 |

Examples 41~47 (Forming H₃TOT Lithium-Ion Secondary Battery)

A cathode sheet was produced the same as in Example 1 using H₃TOT, which was combined with a pre-doped anode to form a lithium-ion secondary battery. At that time, 2.0 M LiPF₆ was used as the electrolyte in Examples 43, 45 and 47 while 1.0 M LiPF₆ was used for the others. In addition, as for the electrolyte solvent, ethylene carbonate/diethyl carbonate (volume ratio of 1:1) was used in Examples 41, 46 and 47, ethylene carbonate/diethyl carbonate (volume ratio of 3:7) in Examples 43 and 45, and ethylene carbonate/dimethyl carbonate (volume ratio of 3:7) in Examples 42 and 44. For charge/discharge evaluations, a charge/discharge tester TOSCAT-3100, made by Toyo Systems was used in Examples 41~43, 46 and 47, while TOSCAT-3300 made by Toyo Systems was used in Examples 44 and 45. Detailed production conditions and charge/discharge conditions are shown in Table 3, and discharge characteristics are shown in FIG. 42~FIG. 48.

Figure 42:
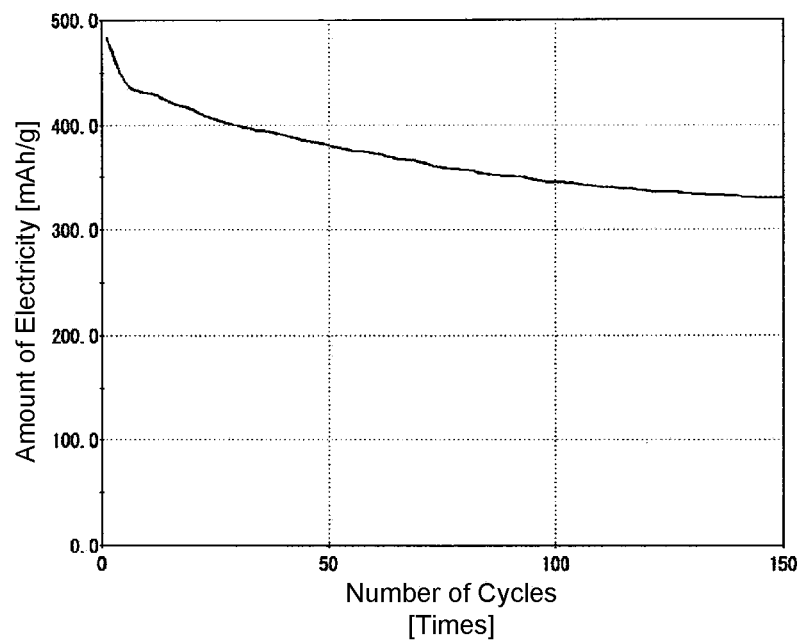
FIG. 42 is a graph showing changes in the discharge capacity of a lithium-ion secondary battery relative to the number of charge/discharge cycles according to Example 41.
Figure 43:
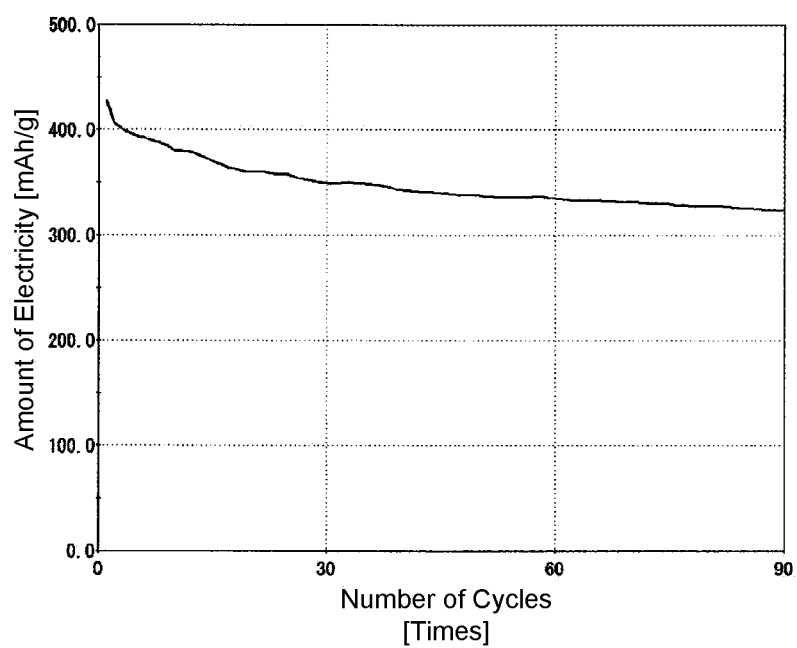
FIG. 43 is a graph showing changes in the discharge capacity of a lithium-ion secondary battery relative to the number of charge/discharge cycles according to Example 42.
Figure 44:
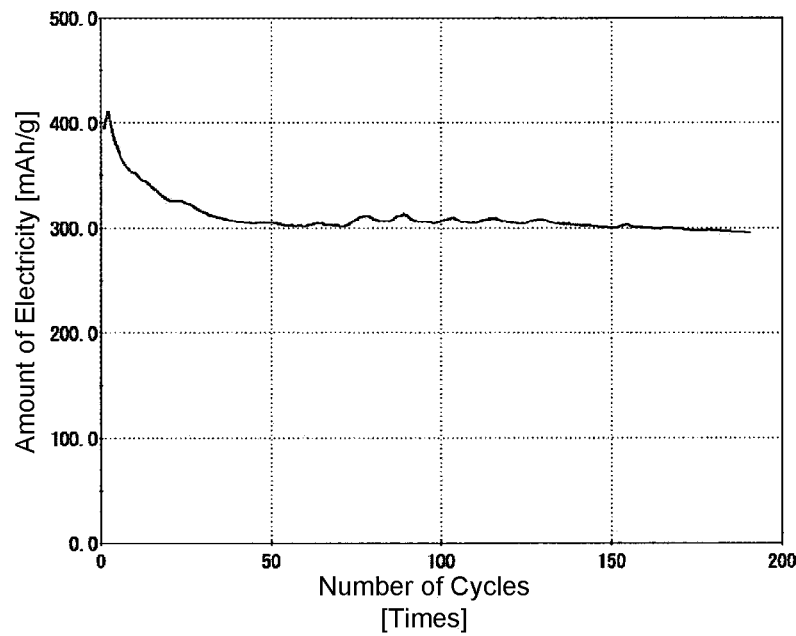
FIG. 44 is a graph showing changes in the discharge capacity of a lithium-ion secondary battery relative to the number of charge/discharge cycles according to Example 43.
Figure 45:
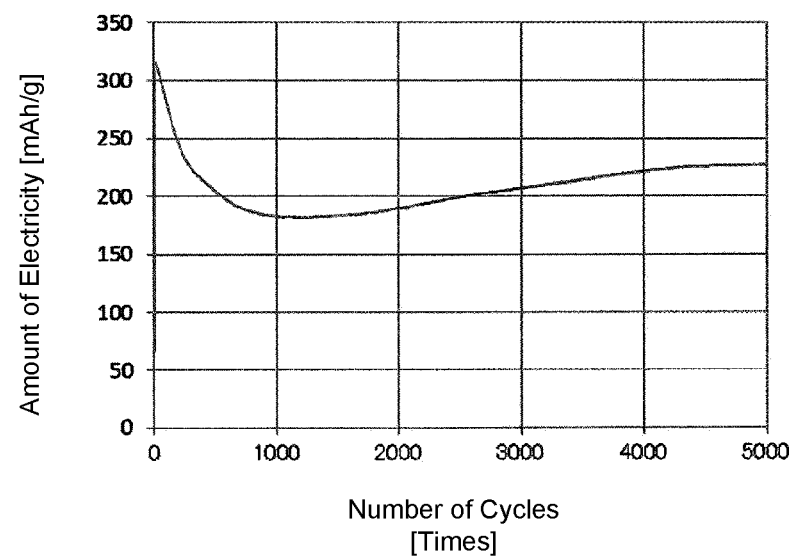
FIG. 45 is a graph showing changes in the discharge capacity of a lithium-ion secondary battery relative to the number of charge/discharge cycles according to Example 44.
Figure 46:
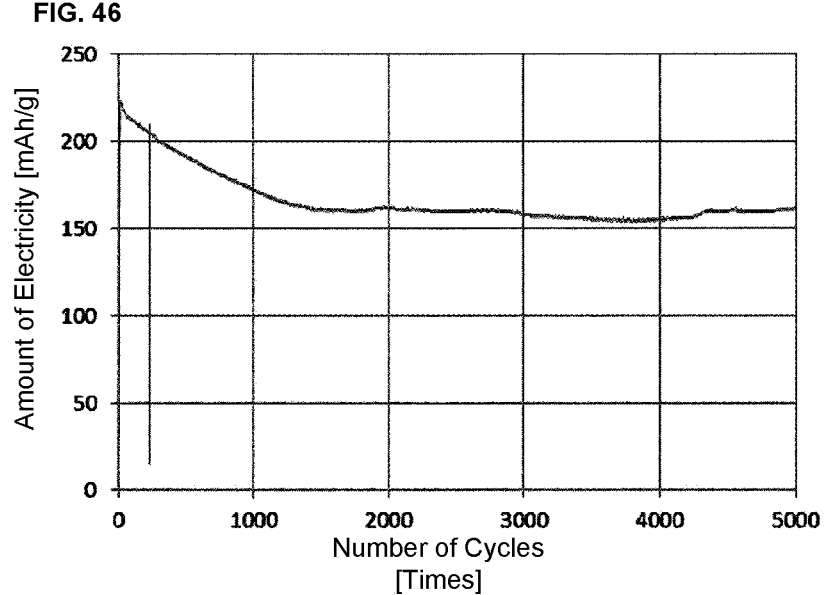
FIG. 46 is a graph showing changes in the discharge capacity of a lithium-ion secondary battery relative to the number of charge/discharge cycles according to Example 45.

In the systems using 10 wt. % H₃TOT and a charge/discharge rate of 1 C, differences in electrolytes and electrolyte solvents did not significantly affect the results as found in FIG. 42~FIG. 44. The same applies to a charge/discharge rate of 100 C (FIG. 45 and FIG. 46). In the systems using 80 wt. % H₃TOT (FIG. 47 and FIG. 48), electrolyte concentrations were compared, but no significant difference was found.

TABLE 3

Figure 47:
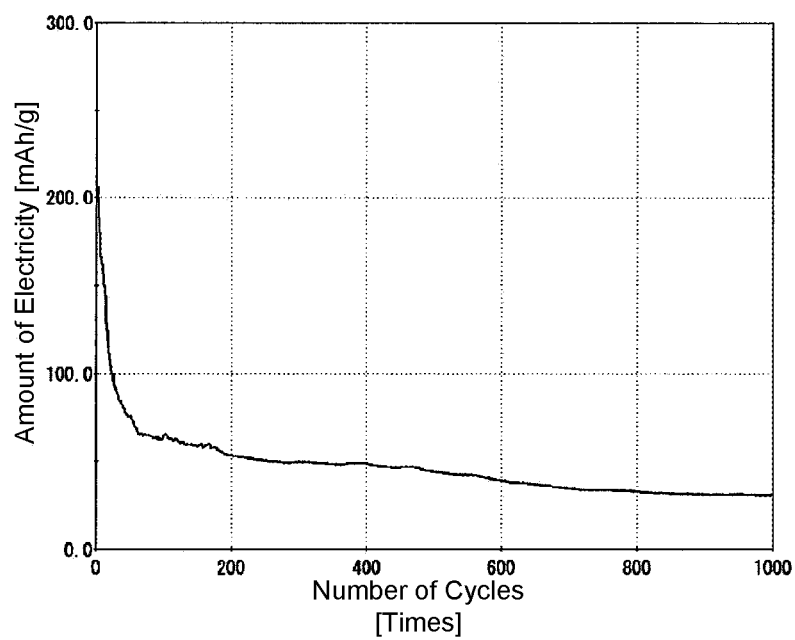
FIG. 47 is a graph showing changes in the discharge capacity of a lithium-ion secondary battery relative to the number of charge/discharge cycles according to Example 46.
Figure 48:
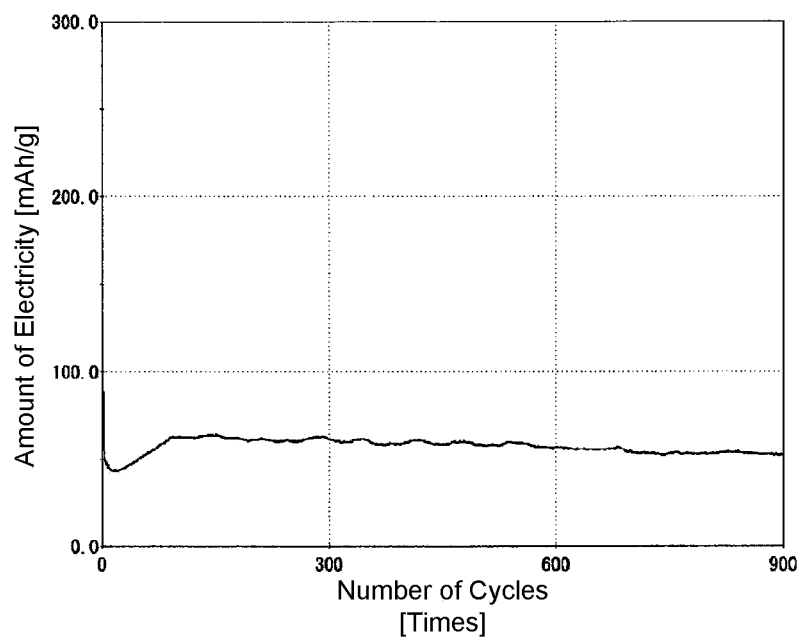
FIG. 48 is a graph showing changes in the discharge capacity of a lithium-ion secondary battery relative to the number of charge/discharge cycles according to Example 47.

| Examples | H₃TOT (wt. %) | Positive electrode film thickness (μm) | Negative electrode | Current rate (C) | Voltage range (V) | Discharge capacity |
|---|---|---|---|---|---|---|
| 41 | 10 | 57 | pre-doped | 1 | 1.4-3.8 | FIG. 42 |
| 42 | 10 | 57 | pre-doped | 1 | 1.4-3.8 | FIG. 43 |
| 43 | 10 | 57 | pre-doped | 1 | 1.4-3.8 | FIG. 44 |
| 44 | 10 | 53 | pre-doped | 100 | 1.4-3.8 | FIG. 45 |
| 45 | 10 | 57 | pre-doped | 100 | 1.4-3.8 | FIG. 46 |
| 46 | 80 | 49 | pre-doped | 1 | 1.4-3.8 | FIG. 47 |
| 47 | 80 | 49 | pre-doped | 1 | 1.4-3.8 | FIG. 48 |

What is claimed is:

1. An electrode sheet, comprising repeatedly laminated layers, each of the layers comprising a carbon nanotube and trioxotriangulene derivative of the following formula (1):

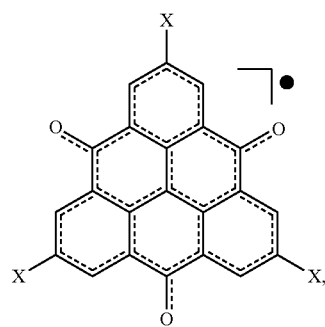

(1)

wherein X's are hydrogen, a halogen, or a monovalent organic group, and may be the same or different from each other.

2. The electrode sheet of claim 1, wherein X's are hydrogen, a halogen, or an alkyl or aryl group having at least 6 carbon atoms, and may be the same or different from each other.

3. The electrode sheet of claim 1, wherein X's are each bromine.

4. The electrode sheet of claim 1, wherein X's are each hydrogen.

5. The electrode sheet of claim 1, wherein the electrode sheet does not comprise a binder.

6. A nonaqueous electrolyte secondary battery, comprising:
the electrode sheet of claim 1.

7. A nonaqueous electrolyte secondary battery, comprising:
a cathode comprising the electrode sheet of claim 1.

8. The nonaqueous electrolyte secondary battery of claim 7, further comprising:
a pre-doped anode comprising a lithium ion doped in graphite.

9. The nonaqueous electrolyte secondary battery of claim 8, wherein X's are hydrogen, a halogen, or an alkyl or aryl group having at least 6 carbon atoms, and may be the same or different from each other.

10. The nonaqueous electrolyte secondary battery of claim 8, wherein X's are each bromine.

11. The nonaqueous electrolyte secondary battery of claim 8, wherein X's are each hydrogen.

12. The nonaqueous electrolyte secondary battery of claim 8, wherein the electrode sheet does not comprise a binder.

13. A method of producing an electrode sheet, the method comprising:
preparing a dispersion having a trioxotriangulene derivative of the following formula (1) and a carbon nanotube dispersed in a solvent,

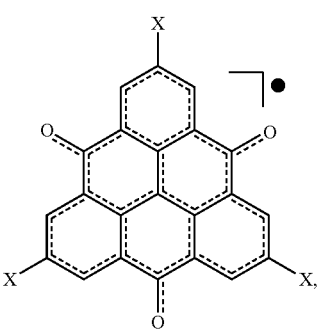

(1)

wherein X's are hydrogen, a halogen, or a monovalent organic group, and may be the same or different from each other;

supplying the dispersion on a filter;

filtering the dispersion such that a filtrate is obtained on the filter;

conducting at least one more time the supplying and the filtering such that a residual filtrate having a plurality of layers is obtained; and drying the residual filtrate to obtain an electrode sheet having the plurality of layers, wherein each of the plurality of layers comprises the carbon nanotube and the trioxotriangulene derivative.

14. The method of claim 13, wherein X's are hydrogen, a halogen, or an alkyl or aryl group having 6 or fewer carbon atoms, and may be the same s or different from each other.

15. The method of claim 13, wherein X's are each bromine.

16. The method of claim 13, wherein X's are each hydrogen.

17. The method of claim 13, wherein the electrode sheet does not comprise a binder.

18. A method of producing a nonaqueous electrolyte secondary battery, the method comprising:

forming a pre-doped anode sheet; and forming a cathode sheet, wherein the forming of the pre-doped anode sheet comprises contacting lithium foil and an anode sheet, and the forming of the cathode sheet comprises:

preparing a dispersion having a trioxotriangulene derivative of the following formula (1) and a carbon nanotube dispersed in a solvent,

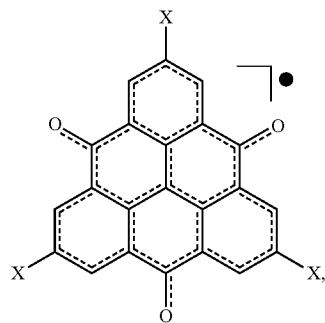

wherein X's are hydrogen, a halogen, or a monovalent organic group, and may be the same or different from each other, supplying the dispersion on a filter, filtering the dispersion such that a filtrate is obtained on the filter, conducting at least one more time the supplying and the filtering such that a residual filtrate having a plurality of layers is obtained, and drying the residual filtrate to obtain the cathode sheet having the plurality of layers, wherein each of the plurality of layers comprises the carbon nanotube and the trioxotriangulene derivative.

19. The method of claim 18, wherein X's are each bromine.

20. The method of claim 18, wherein X's are each hydrogen.

* * * * *